US012599943B2

(12) United States Patent
Camell

(10) Patent No.: US 12,599,943 B2
(45) Date of Patent: Apr. 14, 2026

(54) SYSTEM FOR SPRAYING THE INTERIOR OF A CONTAINER

(71) Applicant: Core Insight Systems, Inc., Placentia, CA (US)

(72) Inventor: Charles Anthony Camell, Placentia, CA (US)

(73) Assignee: Core Insight Systems, Inc., Irvine, CA (US)

( * ) Notice: Subject to any disclaimer, the term of this patent is extended or adjusted under 35 U.S.C. 154(b) by 0 days.

(21) Appl. No.: 17/384,658

(22) Filed: Jul. 23, 2021

(65) Prior Publication Data

US 2022/0080475 A1 Mar. 17, 2022

Related U.S. Application Data

(63) Continuation of application No. 16/993,172, filed on Aug. 13, 2020, now Pat. No. 11,090,700.

(51) Int. Cl.

| | |
|---|---|
| ***B08B 9/093*** | (2006.01) |
| ***B01F 15/00*** | (2006.01) |
| ***B01F 35/10*** | (2022.01) |
| ***B05B 15/62*** | (2018.01) |
| ***B05B 15/68*** | (2018.01) |

(Continued)

(52) U.S. Cl.
CPC .......... *B08B 9/093* (2013.01); *B01F 35/1453* (2022.01); *B05B 15/62* (2018.02); *B05B 15/68* (2018.02); *B28C 5/4203* (2013.01); *B01F 2101/28* (2022.01); *B08B 2209/08* (2013.01)

(58) Field of Classification Search
CPC ... B08B 9/093; B08B 2209/08; B08B 9/0933; B08B 9/0813; B01F 35/1453; B01F 2101/28; B05B 15/62; B05B 15/68; B05B 1/202; B05B 7/2486; B05B 7/2494; B05B 13/0681; B05B 1/205; B05B 12/04;
(Continued)

(56) References Cited

U.S. PATENT DOCUMENTS 3,707,990 A 1/1973 Schaible et al.
3,895,756 A 7/1975 Jaeger
(Continued)

FOREIGN PATENT DOCUMENTS

CN 1781778 A 6/2006
CN 101868305 B * 1/2013
(Continued)

*Primary Examiner* — Alexander Markoff
(74) *Attorney, Agent, or Firm* — Avyno Law P.C.

(57) ABSTRACT

A spraying system and method is provided for more efficiently accessing the interior of a container having an access opening to the container that is offset from or in angular relationship to the center and/or rotational axis of the container to contact the interior walls and surfaces of the container with a medium, such as a liquid, mixture, solution or suspension. The spraying system and method includes a non-linear boom that is elevated by a support structure, where the non-linear boom includes at its front end a plurality of spray nozzles. In one example, the support structure is a movable support structure that includes a guide mechanism where the guide mechanism is mounted on the moveable support structure at an angle relative to the surface supporting the moveable support structure to allow access to the interior of the container.

10 Claims, 19 Drawing Sheets

(51) Int. Cl.
*B28C 5/42* (2006.01)
*B01F 101/28* (2022.01)

(58) Field of Classification Search
CPC . B05B 7/0876; B05B 9/0423; B05B 13/0627; B05B 15/70; B28C 5/4203
See application file for complete search history.

(56) References Cited

U.S. PATENT DOCUMENTS

| | | | | |
|---|---|---|---|---|
| 3,917,170 | A * | 11/1975 | Marino | C21C 5/443 239/176 |
| 4,548,236 | A | 10/1985 | Bloomquist | |
| 4,784,324 | A | 11/1988 | DeWitt et al. | |
| 4,805,653 | A | 2/1989 | Krajicek et al. | |
| 4,856,545 | A | 8/1989 | Krajicek et al. | |
| 4,941,491 | A | 7/1990 | Goerss et al. | |
| 5,244,498 | A * | 9/1993 | Steinke | B08B 9/093 106/806 |
| 5,718,382 | A | 2/1998 | Jaeger | |
| 6,418,948 | B1 * | 7/2002 | Harmon | B28C 5/468 134/198 |
| 6,640,817 | B2 | 11/2003 | Harmon | |
| 6,698,451 | B2 | 3/2004 | Anderson et al. | |
| 6,871,658 | B2 | 3/2005 | Gjestvang | |
| 6,983,763 | B2 | 1/2006 | Benckert et al. | |
| 9,370,801 | B1 | 6/2016 | Short, Jr. et al. | |
| 9,827,603 | B2 | 11/2017 | Eastwood et al. | |
| 10,100,206 | B1 | 10/2018 | Wetherell | |
| 2002/0069897 | A1 | 6/2002 | Emrey | |
| 2004/0065357 | A1 | 4/2004 | Burch | |
| 2007/0079852 | A1 * | 4/2007 | Boos | B08B 9/093 134/167 R |
| 2007/0086270 | A1 * | 4/2007 | Harris | B08B 9/0813 366/59 |
| 2010/0108100 | A1 * | 5/2010 | Brand | B08B 3/02 134/123 |
| 2013/0174876 | A1 * | 7/2013 | Greenwood | B08B 9/0936 134/167 R |
| 2014/0190524 | A1 * | 7/2014 | Eastwood | B08B 9/0936 134/169 R |
| 2017/0072916 | A1 * | 3/2017 | Beck, III | B28C 7/00 |
| 2017/0259309 | A1 | 9/2017 | Innes et al. | |
| 2018/0250847 | A1 * | 9/2018 | Wurtz | B28C 5/4203 |
| 2020/0023325 | A1 * | 1/2020 | Dörr | B01F 29/80 |
| 2021/0283667 | A1 * | 9/2021 | Cole | B60P 3/30 |
| 2022/0288657 | A1 * | 9/2022 | Sweet-Kirkwood | B01F 35/1452 |
| 2022/0297433 | A1 * | 9/2022 | Benton | B41J 29/377 |

FOREIGN PATENT DOCUMENTS

| | | | | |
|---|---|---|---|---|
| CN | 205797597 | U | 12/2016 | |
| EP | 2548924 | B1 | 11/2014 | |
| EP | 3556481 | A1 | 10/2019 | |
| KR | 101688369 | B1 | 12/2016 | |
| WO | WO-2020010142 | A1 * | 1/2020 | B60P 3/00 |

* cited by examiner 1810
1812
1806
1814
1802
1804
PULLEY & CABLE DETAILS

5/8" TURNBUCKLE
3.5" DIA PULLEY
1800
3.5" DIA PULLEY
OPEN SWAGE SOCKET
GUIDE PIPE/TUBE (2EA)
CARRIES WATER & TRACKS THE BOOM 1806
1800
1810
1802
1804
DETAIL A
SCALE 1 : 8

R300.00
BEND RADIUS
58.13°

SYSTEM FOR SPRAYING THE INTERIOR OF A CONTAINER

RELATED APPLICATION

This application is a continuation of U.S. patent application Ser. No. 16/993,172, filed on Aug. 13, 2020, titled SYSTEM FOR SPRAYING THE INTERIOR OF A CONTAINER, which is incorporated in its entirety by reference in this application.

FIELD OF THE INVENTION

The invention relates, in general, to a system, apparatus and method for cleaning, coating and/or more generally spraying the interior walls and surfaces of a container, and more particularly for contacting the interior of the container with a liquid, mixture, solution or suspension.

BACKGROUND OF THE INVENTION

Mixing/holding containers, and in particular, rotating drums mounted on mobile equipment for mixing and delivering materials, such as concrete, to remote locations must be cleaned periodically or have materials applied to the inside, such as protective materials. With use, the materials stored or mixed in the containers, such has concrete, builds up on the interior surface of the drum. Over time, the accrual of material, such as concrete, builds up on the internal surfaces of the drum and typically becomes significant.

In the case of a concrete mixing drum, for example, once a significant amount of concrete has built-up in the drum, the efficiency of the mixing drum is greatly reduced. Trucks carrying mixing drums with a build-up of concrete on the interior walls of the drum are heavier when moving empty. As the concrete on the walls of the drums thickens, the available volume in the drum decreases. The increased weight of the truck decreases fuel efficiency and transportation efficiency, thereby increasing the expenses associated with maintaining and operating the concrete mixing truck. As the drum volume decreases, a truck's output also decreases, thereby minimizing the profitability and productivity of a truck, requiring more trips per large job.

To avoid the decreased efficiencies noted above, the rotating mixing drums on the concrete trucks, for example, need to be manually cleaned periodically to remove the buildup of hardened concrete on the interior surfaces of the drum. However, cleaning the inside of a container, like a rotating mixing drum on a concrete truck, can be rather challenging since access to mixing drum is through an opening in a hopper that is angularly offset from the opening to the mixing drum.

In particular, and for example, a concrete mixing truck generally includes a chassis for driving the truck and an extended frame with a mixing drum mounted thereon which rotates. The mixing drum is a large cylindrical housing generally mounted angularly upward from horizontal. Inside the mixing drum are helical ribbons affixed to the drum to mix the concrete while the drum is rotating and to expel concrete from the drum for use. During operation, dry and/or wet ingredients (e.g., cement) are fed into the mixing drum through the hopper. The ingredients are then mixed in the drum through the movement of the helical ribbons. To aid in the consistency of the concrete, dilution water may be manually added from the onboard water tank into the mixing drum. Once mixed, the concrete can then be discharged from the chute for use.

As seen in Prior Art FIG. 22, the mixing drum 10 has an opening 12 on one end to both expel concreted from the drum 10 and to receive the ingredients (e.g., cement) used to create the concrete. On the upper end of the mixing drum 10 is a hopper 14 and discharge chute 16. The hopper 14 resembles a funnel having a large opening 18 facing upward. The hopper 14 receives the cement mixing ingredients and feeds it into the mixing drum 10 through the opening 12 in the mixing drum. The discharge chute 16 discharges concrete from the mixing drum 10. The mixing drum 10 has a center axis 20, which is also its axis of rotation. The plane 22 of the opening 12 on the mixing drum 10 is generally perpendicular to the center axis 20. However, the plane 24 of the opening 18 of the hopper 14 is angularly offset from both the center axis 20 and the plane of the opening 18 on the hopper 14, thereby preventing direct axis along the center axis 20 of the container into the mixing drum 10. It is for this reason that spraying the interior of the mixing drum 10 without hitting the helical ribbons 26 or interior sides of the mixing drum 10 is challenging.

Over the years, solutions and chemicals have been developed to assist with the removal of the hardened concrete from the interior walls of the mixing drum and helical ribbon. For example, uncured cementitious material and aqueous solutions with colloidal silica, as well as silicone-based polymers and other solvents have been used to clean and pretreat surfaces of various drums by pouring the chemicals directly into the mixing drum 10. However, these processes have not proven to work well and thus, accessing the interior of drum for material buildup removal continues to be required.

Cement drums have also been cleaned by using high-pressure water hoses, pneumatic tools, and hand tools to spray and chisel the concrete from the drum surfaces. However, cleaning personnel must manage the high-pressure hoses and tools that are required to enter the interior of the drum. Employing individuals to manage the hoses and tools is not only quite labor-intensive, but also can be hazardous.

In response, washing systems have been developed that insert linear or straight booms through the opening in the rear of the drum. Such washing systems generally utilize high-pressure nozzles positioned within the drum. The washing systems spray the interior surface of the drum with high-pressure wash water to dislodge soft concrete from the interior surfaces of the drum. Because the opening 18 of the hopper 14, as seen in Prior Art FIG. 22, is angularly offset from the opening 12 of the mixing drum 10, it is not possible to insert a linear boom through the opening in the hopper 14 and into the interior of the mixing drum 10 without contacting the interior sides of the mixing drum and/or the helical ribbons 24. To use linear booms, the hopper must be removed, detached, or mechanically modified (e.g., to include an access panel or door) so that the linear boom can be inserted into the mixing drum along the center or rotational axis of the mixing drum. However, removing, detaching, or modifying the loading hopper can be very labor-intensive and time consuming.

Thus, a need exists for efficient spraying systems for containers where entry into the interior of the container is through an access opening that is offset from the center and/or rotational axis of the container. This need is not limited to mixing drums on concrete trucks but exist across different industries for different applications, for both containers for mixing material and for storing materials, especially when there is no direct access to the center of interior of the container for treating, cleaning and/or washing the interior of the container. For example, in the case of concrete mixing drums, the angle of entry 30 (see Prior Art Figure A) through the hopper 14 into the interior of the mixing drum 10 is approximately 20-50 degrees relative to the center axis or rotational axis 20 of the mixing drum 10.

Accordingly, there remains a need in the art for a system, apparatus and method that provides for angular access to the interior of a container having an access opening to the interior of the container that is offset from the center axis of the container, such as a materials mixing drum, to enable the interior walls and surfaces of the container to be sprayed with a medium, such as a liquid, mixture, solution or suspension and that does not require any structural modifications to the container or its component parts. A need further exists for a boom that supports spray nozzles and/or other attachments, that can enter a container in at an angle relative to the center axis of the container and follow the center axis and/or rotational axis of the container to protect the spray nozzles and/or attachments on the boom from damage by impact with the interior surfaces of the container or interior components of the container, such as helical ribbons, as the boom advances through the container.

SUMMARY

A spraying system is provided that includes a non-linear shaped boom, where the non-linear boom is able to be inserted into an access opening to a container that is angularly offset from the container's centerline. For example, the spray system may be used with a mixing drum having a hopper to spray the inside of the mixing drum without requiring any modifications to the container, or the removal or modification of any component part of the container, such as a hopper, to gain access to the interior of the container that permits the spaying system to run generally along the centerline of the container.

In one example, the spraying system includes a non-linear boom having a plurality of spray nozzles mounted to the front end of the non-linear boom. The non-linear boom is then elevated by a support structure. The support structure may further include a boom support mounted to the support structure. The boom support includes a guide system for engaging and supporting the non-linear boom in an elevated position. The guide system may further include a motor for moving the non-linear boom from a retracted to an extended position. When used to clean a mixing drum, such as one used to mix concrete, the support structure aligns the front end of the non-linear boom with the top of the hopper on the mixing drum to allow the front end of the non-linear boom to enter the mixing drum through the top opening of the hopper mounted on the mixing drum.

In yet another example, the support structure is a movable support structure that includes a guide system, where the guide system supports the non-linear boom at an angle relative to the center and/or rotational axis of the container, e.g., mixing drum, or to the surface supporting the support structure to allow the front end of the non-linear boom to enter the container through an access opening that is not aligned with the center and/or rotational axis of the container, e.g., through the top opening in a hopper mounted on a mixing drum. The support structure of the present invention may be a movable support structure, such as a scissor lift, or a stational support structure fixed on, for example, piers or a platform with truss supports.

In a further example, a system for washing the interior of a mixing drum having a hopper with a top opening mounted on the mixing drum is provided. The system comprises (i) a non-linear boom having a front end and rear end; (ii) a plurality of spray nozzles positioned on the front end of the non-linear boom; (iii) a support structure for supporting the non-linear boom; and (iv) a guide system mounted on the support structure, the guide system supports the non-linear boom in an elevated position, where the guide system supports the non-linear boom at an angle relative to the center axis of the mixing drum when the hopper of the mixing drum is aligned with the front end of the non-linear boom and where the guide system further moveably engages and supports the non-linear boom from a retracted to an extended position to allow the front end of the non-linear boom to enter the mixing drum through the top opening in the hopper on the mixing drum when the front end of non-linear boom is aligned with the top opening of the hopper on the mixing drum. Alternatively, the guide system engages the non-linear boom in an elevated position above the hopper on the concrete mixing drum, the guide system further including a motor for moving the non-linear boom from a retracted to an extended position to allow the front end of the non-linear boom to enter the mixing drum through the top opening in the hopper on the mixing drum when the front end of boom is aligned with the top opening of the hopper on the mixing drum, and where the support structure maintains the guide system at an angle relative to the surface on which the support structure rests.

In certain examples of implementations, the non-linear boom of the spraying system may have an angle of curvature from 45 to 135 degrees and a radius of curvature from 90 to 500 inches. The spraying system may further maintain the guide system at an angle relative to the surface on which the support structure rests, at, for example, an angle of between 35 to 65 degrees relative to the surface on which the support structure rests. Further, the guide system may support the non-linear boom at between a 20 to 50-degree angle relative to the centerline of the container. The spraying system may include at least one spray nozzle on the front end of the non-linear boom, or a plurality of spray nozzles, which may be all positioned at the end or near the end of the non-linear boom. The spraying system may further include at least one atomizer on the end or near the end of the non-linear boom in addition to at least one spray nozzle.

A method is further provided for spraying the interior surfaces of a container where the access opening to the interior of the container is offset from the center or rotational axis of the container, such as a mixing drum. The method further including the steps of providing a non-linear boom having a front end fitted with spray nozzles, elevating the non-linear boom at an angle relative to the surface supporting the container such that the front end of the non-linear boom is positioned over the access opening of the container and extending the non-linear boom into the access opening of the container into the interior of the container.

According to another example, a method of the present invention for spraying a medium on the interior of a rotating container includes providing a non-linear boom having a plurality of spray nozzles on the front end of the boom, inserting the front end of the non-linear boom into the interior of the container; and introducing medium into the plurality of spray nozzles while the container is rotating. The rotating container may be a mixing drum having a hopper with a top opening where the step of inserting the front end of the non-linear boom into the interior of the container further includes inserting the front end of the non-linear boom into the interior of the container through the top opening of the hopper.

The method may further include introducing a medium into the spray nozzles at a pressure and for a time sufficient to spray the interior of the container and/or spraying medium into the interior of the container through the spray nozzles and at least one atomizer nozzle at a pressure and for a time sufficient to spray the interior of the container, where the medium is introduced into the spray nozzles and atomizer in multiple stages. For example, the method may include spraying medium into the interior of the container through the spray nozzles and at least one atomizer nozzle, which may include spraying medium through at least one spray nozzle for a predetermined period of time, followed by spraying medium though at least one the atomizers for a predetermined period of time. All of the above methods may further include at least one atomizer on the end of the non-linear boom in addition to at least one spray nozzle, where the at least one atomizer sprays medium on the interior of the container.

Other devices, apparatus, systems, methods, features and advantages of the invention are or will become apparent to one with skill in the art upon examination of the following figures and detailed description. It is intended that all such additional systems, methods, features and advantages be included within this description, be within the scope of the invention, and be protected by the accompanying claims.

DESCRIPTION OF FIGURES

The invention may be better understood by referring to the following figures. The components in the figures are not necessarily to scale, emphasis instead being placed upon illustrating the principles of the invention.

FIG. 19 is a cross-section of the non-linear boom FIG. 18 taken along line 19-19 of FIG. 18.

DETAILED DESCRIPTION

As illustrated by FIGS. 1-20, the present invention relates to a spraying system having a non-linear boom that easily aligns with an entry opening for the container that is offset from the center axis of the container, such as of a mixing drum, for example, of the type found on a mixing truck, to spray a medium, such as a liquid, mixture, solution or suspension on the interior of the container for application to the interior of the container or for cleaning of the interior of the container. As illustrated and described further below, the spraying system does not require any modification to a container or its component parts for use. For example, in the case of a mixing drum having a loading hopper, the spraying system of the present invention enables the non-linear boom of the spraying system to access the interior of the mixing drum through the opening in the hopper without requiring the removal of, or any modification to, the hopper or the mixing drum. The present invention is designed such that the non-linear boom of the spraying system is able to extend directly into the hopper of the mixing truck at an angle offset from the drum's centerline but that, once inside the container, generally follows the centerline to avoid contact with the sides of the drum or any interior components, such as helical ribbons.

For purposes of this application, the term "container" means an object designed to hold, store, mix or transport material and has an entry point off the centerline and/or rotational axis of the container, and includes, but is not limited to a drum, such as a rotating cement mixing drum, and/or vessel. The term "non-linear boom" means a boom where substantially all the length of the boom is not straight, such that the term "non-linear boom" includes booms where portions of the boom along its length may be straight, but where the entire length of the boom is not straight. Additionally, the spraying system of the present invention can be used to spray any medium, including but not limited to a liquid, mixture, solution or suspension, which medium may include water. For purposes of this application, the spraying system is not limited to spraying water or solution, as described herein, but may be used to spray any number of desired medium in the interior of the container. The term "access opening" or "entry opening" may be used interchangeably. For purposes of this application, an "access opening" shall mean the outer most opening leading to the interior of the container. In the case of a mixing drum having a hopper, the access opening means the upper opening in the hopper and not the opening on the mixing drum; however, where a container does not include a secondary outer opening, such as the opening on the hopper, the opening on the container shall be considered the access opening.

Figure 4:
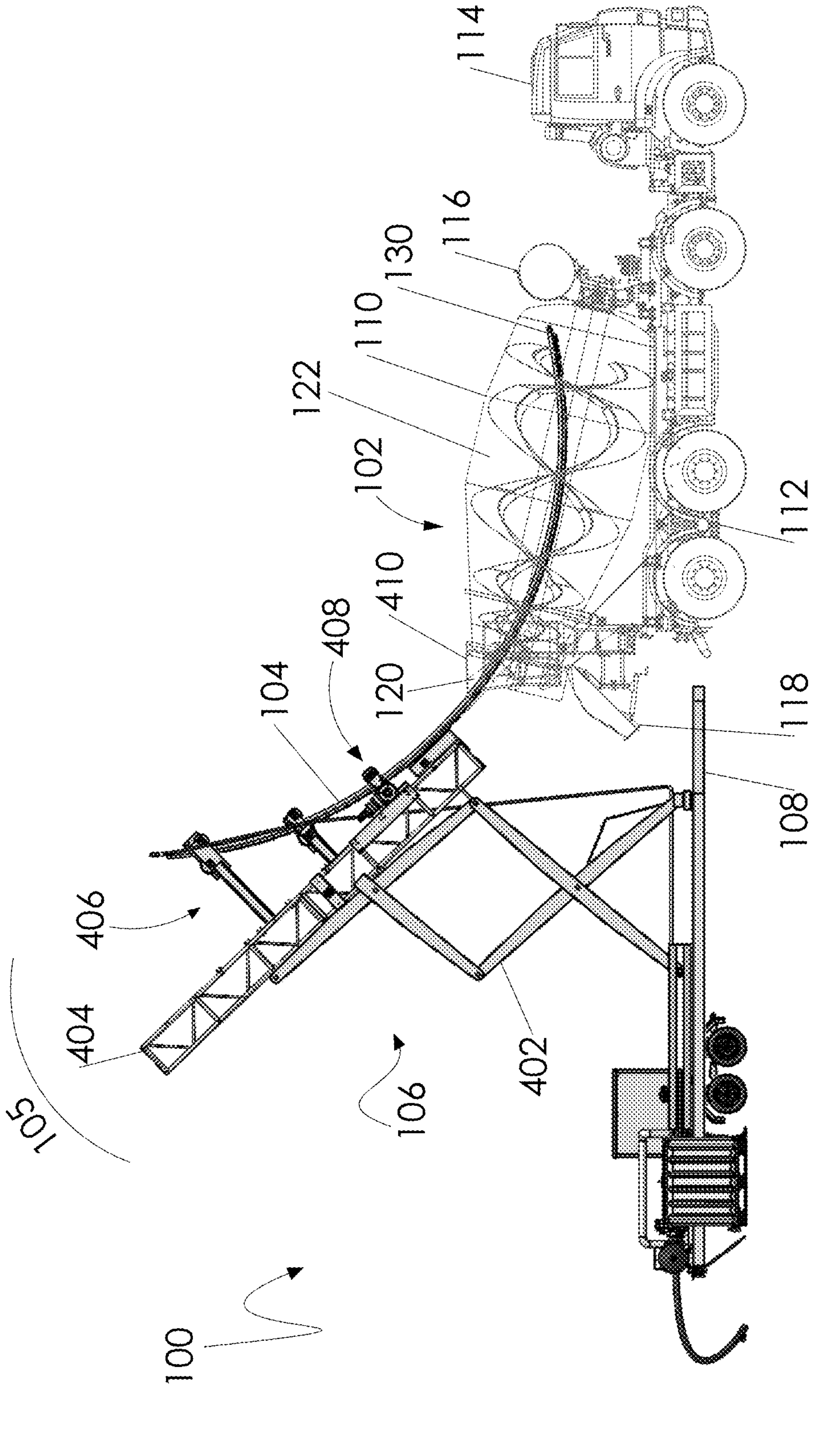
FIG. 4 is a side view of the spraying system of FIG. 1 illustrating the non-linear boom of the spraying system in the extended position.
Figure 17:
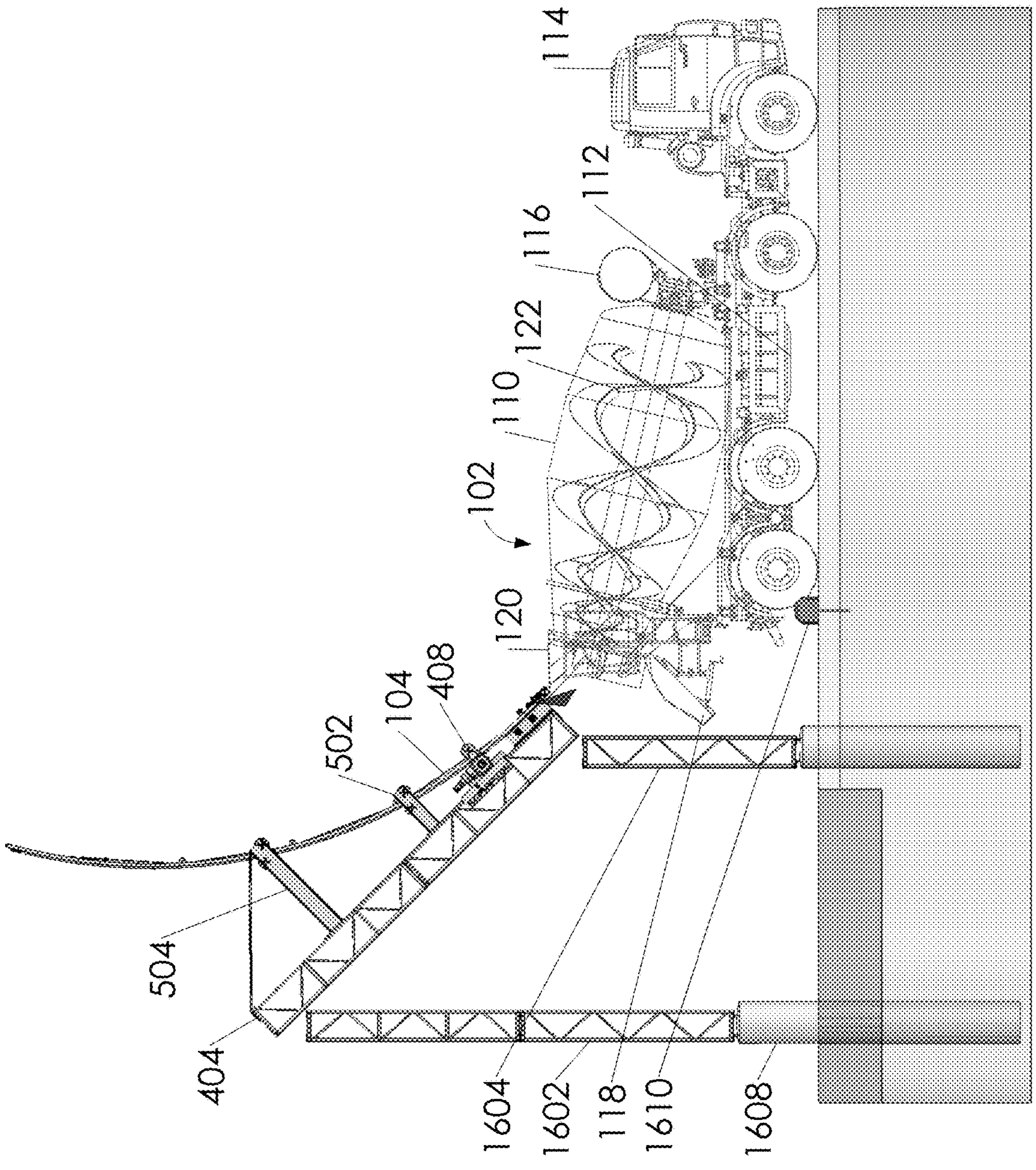
FIG. 17 is a side view of the spraying system of FIG. 16 illustrating the non-linear boom of the spraying system in the extended position.

It is also recognized that the spraying system of the present invention may be used with different types of containers without departing from the scope of the invention. However, for purposes of illustrating the invention, the spraying system will be described in this application in connection with a mixing truck outfitted with a rotating mixing drum, such as a concrete mixing truck, to remove cement deposits remaining inside the drum or to treat the interior surfaces of the drum. The spraying system of the present invention is not so limited to concrete mixing drums on mobile equipment. The spraying system may be used with any container having an access opening or entry point into to the interior of the container that is offset from the center and/or rotational axis of the container. In particular, the spraying system of the invention enables access to the interior of a container through an entry opening that is not aligned with the center or rotational axis of the container, and allows the spraying system to spray medium on the interior of the container without the spraying system, itself, contacting the sides or interior components of the container. Further, while FIGS. 1 & 4 and FIG. 17 illustrate the spraying system used with a rear loaded mixing truck, the spraying system can also be used in the same manner described in connection with a front-loaded mixing truck.

Figure 1:
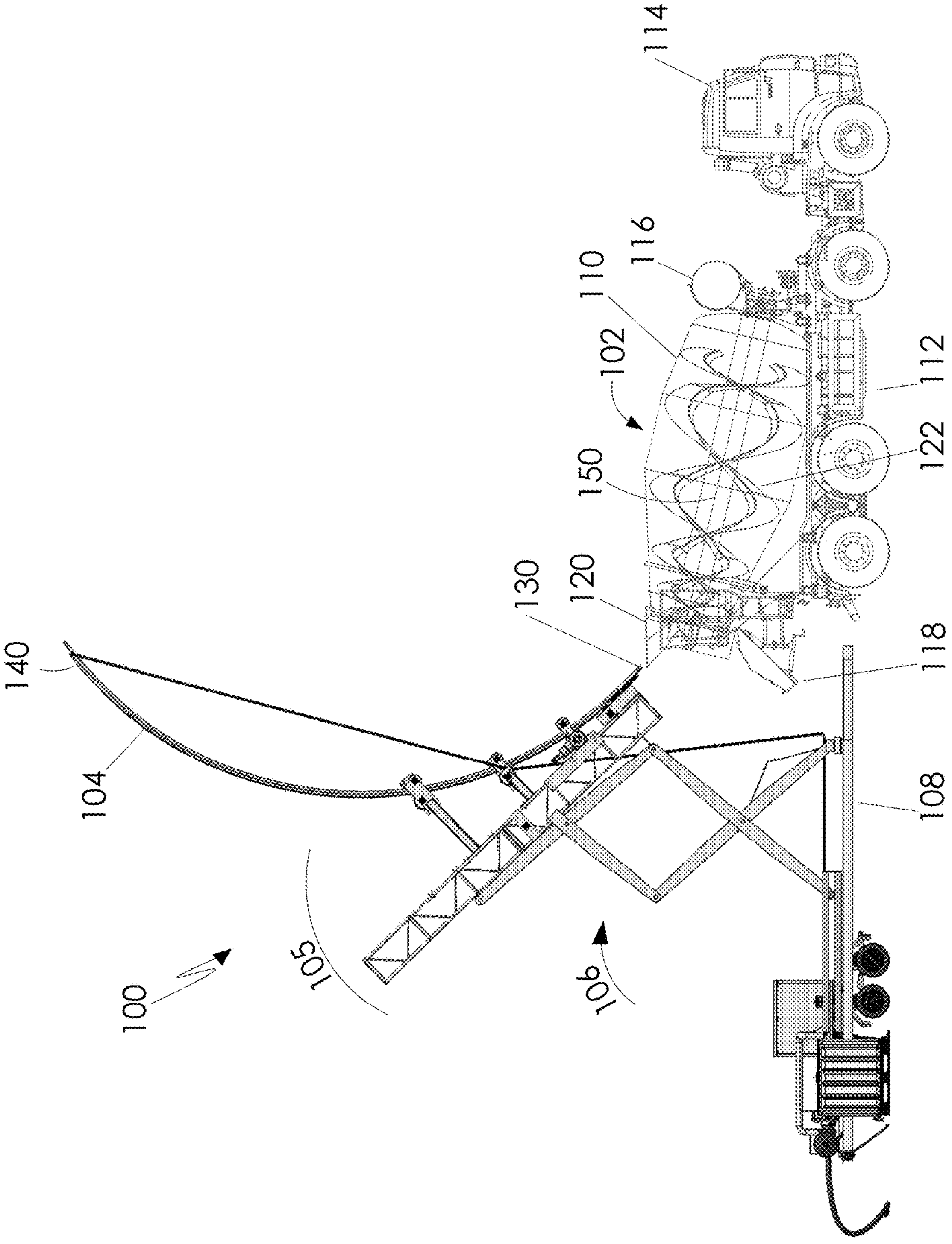
FIG. 1 is a side view of a spraying system in accordance with one example of an implementation of the present invention aligned with a drum on a mixing truck and illustrating the non-linear boom of the spraying system in the retracted position.

Turning now to FIG. 1, FIG. 1 is a side view of a spraying system 100 in accordance with one example of an implementation of the present invention illustrating spraying system 100 aligned with a mixing truck 102 with the non-linear boom 104 of the spraying system 100 in the retracted position. As illustrated in FIG. 1, the spraying system 100 of the present invention includes a non-linear boom 104 that is elevated and supported by a support structure 106. Both the non-linear boom 104 and the support structure 106 are supported on a vehicle 108. While the example of the spraying system 100 in FIGS. 1-15 illustrates the spraying system 100 mounted on a vehicle 108, those skilled in the art will recognize that the spraying system 100 may be permanently affixed to a structure or platform, as may be seen in FIGS. 16 and 17 and described further below. However, mounting the spraying system 100 on a moveable platform, such as trailer 108, enables the spraying system 100 to be made more readily available (i.e., quicker assembly) and provides the user with more versatility (i.e., transports between various locations).

As seen in FIG. 1, the mixing truck 102 generally includes a mixing drum 110 mounted on a chassis 112 in a raised angular position, where the mixing drum has a longitudinal or center axis 150, which may also be the rotational axis of the container in the case of a mixing drum that rotates, such as the mixing drum on a concrete mixing truck. The vehicle 112 is pulled by a chassis 114. Between the chassis 114 and the mixing drum 110 is a water tank 116. On the end of the mixing drum 110 opposite the chassis 114 is a chute 118 for discharging the mixed media or concrete and a hopper 120 for receiving ingredients used to create the media or concrete mixed by the mixing drum 110. The mixing drum 110 further includes helical ribbons 122 in the interior of the mixing drum 110 for mixing the media. As will be explained in more detail below, the non-linear boom 104 of the spraying system 100 includes a front end 130 and back end 140. The front end 130 of the non-linear boom 104 includes spray nozzles 1150 and at least one atomizing nozzle 1118 (see FIG. 13) for facilitating the cleaning and treating of the inside of the mixing drum 110.

Figure 2:
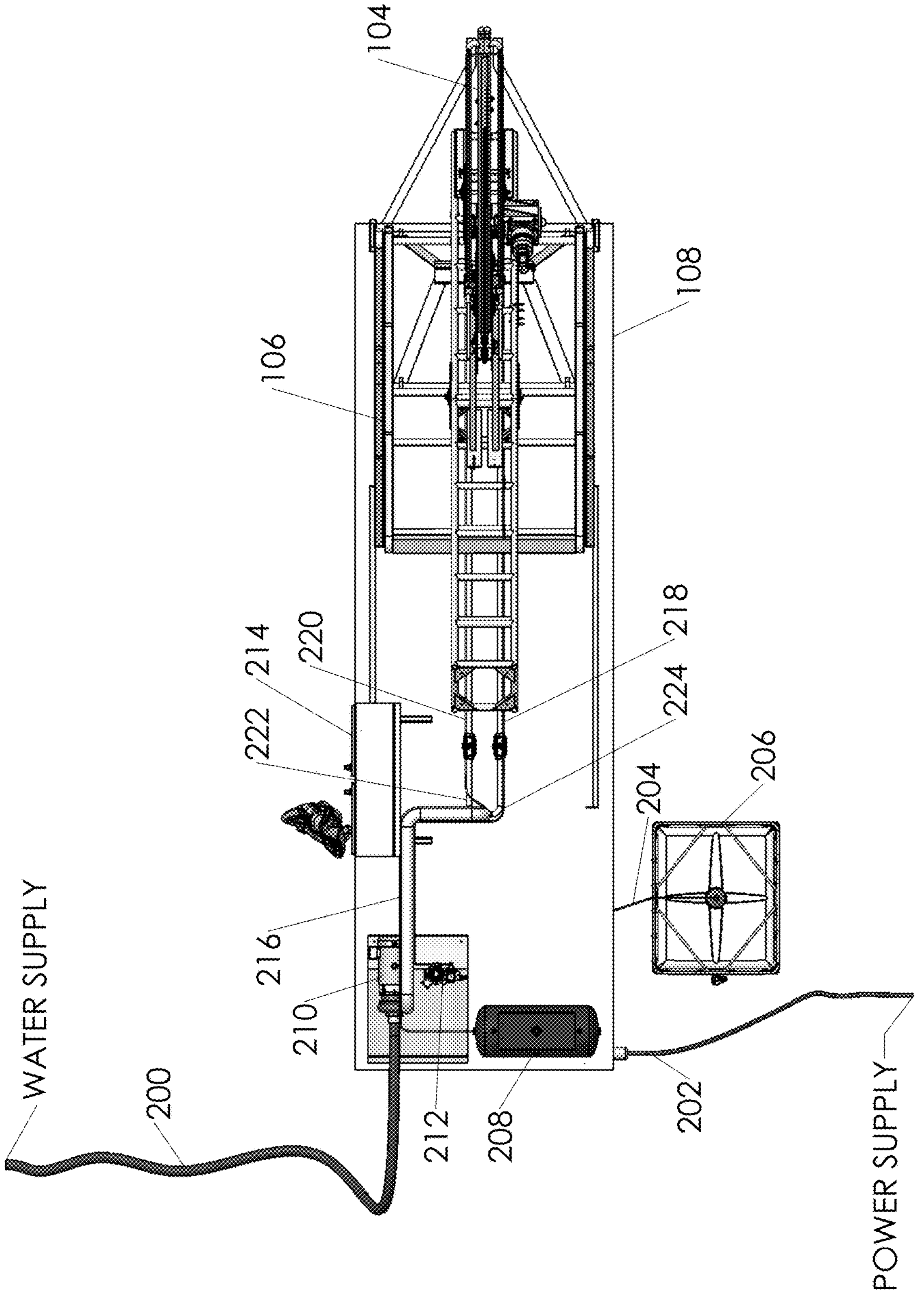
FIG. 2 is a top view of the spraying system of FIG. 1 showing the general system components.

FIG. 2 is a top view of the spraying system 100 showing the general system components of the spraying system 100 of FIG. 1. For operation of the spraying system 100 using water, the spraying system 100 must be supplied with water from a water supply. Here, the water is supplied through a water supply line 200. The spraying system 100 must also be supplied with power through an electrical power supply line 202. When the spraying system 100 utilizes specialized solutions or components to treat or clean the interior of the mixing drum 110, the spraying system 100 is also be provided with the solution through a product feed line 204, which can be supplied from a supply tank 206, which supply tank 206 may be portable and positioned alongside the trailer 108 (as shown) or mounted on the mobile vehicle 108. The spraying system 100 also requires compressed air, which can be provided by an air compressor 208. A water pump 210 is further used to pump water through the spraying system 100 received from the water supply line 200. A second pump or product pump 212 is also used to pump solution received from the supply tank 206. A control panel 214 is also provided to control the operation of the spraying system 100.

Water from the water pump 210 is pumped through a main water line 216 which is split into a first water line 218 and second water line 220, which water lines 218, 220 both supply water to the non-linear boom 104 (as will be explained further below). Compressed air is also supplied via air line 222 alongside the second water line 220 to the non-linear boom 104. Product or solution is also provided from the product pump 212 through a product supply line 224 that runs alongside the first water line 218 to the non-linear boom 104. While FIG. 2 illustrates the air line 222 running alongside the second water line 220, and the product supply line 224 running alongside the first water line 218, one skilled in the art will recognize that this configuration may be reversed such that the air line 222 may run alongside the first water line 218 and the product supply line 224 may run alongside the second water line 220, or alternatively, both the air line 222 and product supply line 224 can run along the same water line—either the first or second water line 218 or 220. Additionally, those skilled in the art will recognize that although the invention is described as using and pumping water through water pump 210 and water lines 218, 220, rather than having water as the supply source another medium, e.g., a cleaning solution, can be pumped through lines of the spraying system 100 and sprayed on the interior of the drum through spray nozzles 1150 (See FIG. 11).

Figure 3:
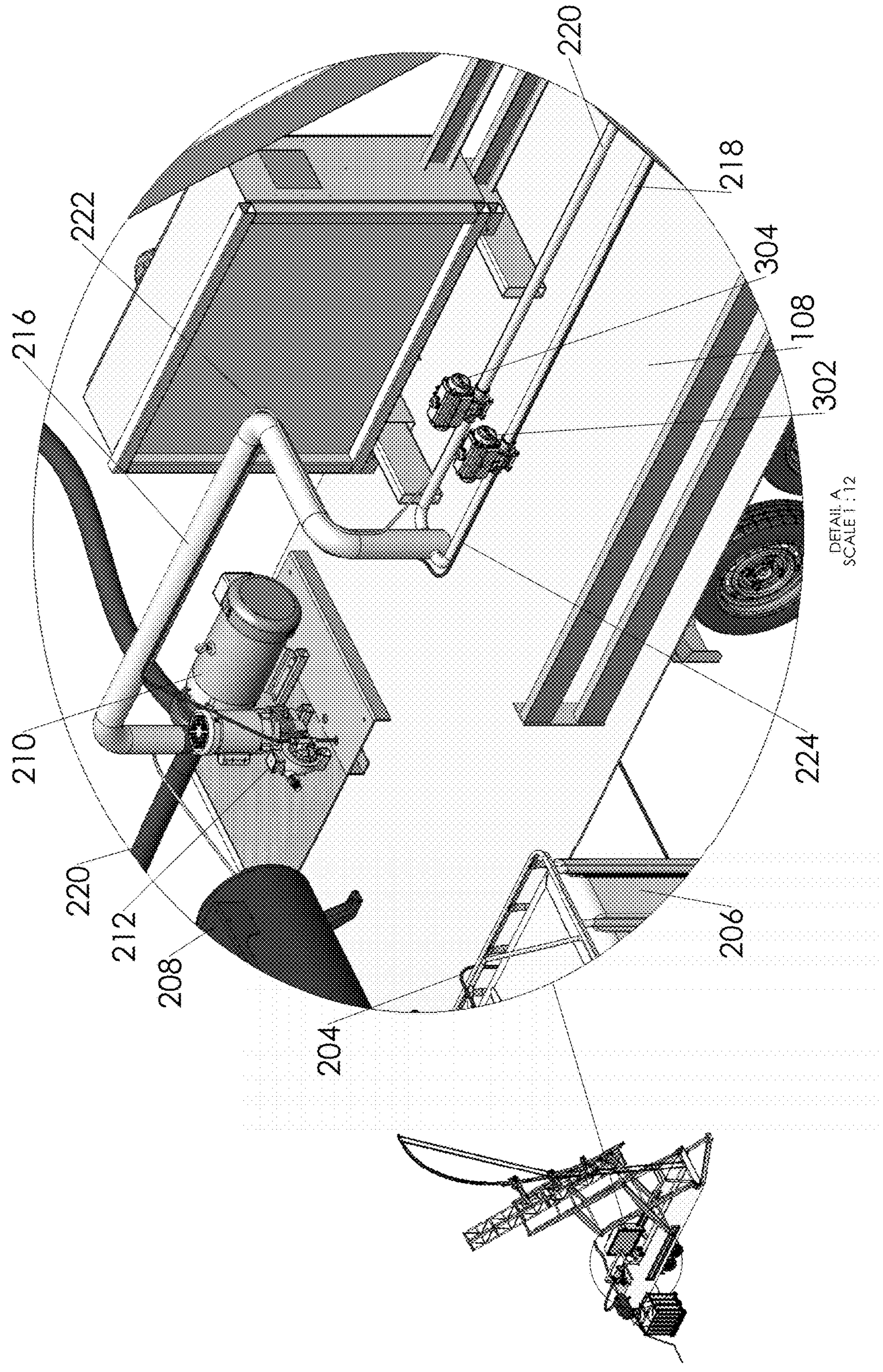
FIG. 3 is a further enlarged detailed view of the system components of the spraying system shown in FIG. 2.

FIG. 3 is a further detailed view of the system components of the spraying system 100 shown in FIG. 2, and best shows the various system components of the spraying system 100. As shown in FIG. 3, water supply line 200 is connected to water pump 210 which pumps water through the main water line 216. The main water line 216 then splits into a first and second water line 218 and 220 which transports water to the non-linear boom 104. Each of the first and second water lines 218, 220 include a first and second hydraulic valve 302 and 304 which enables the spraying system 100 to control the water supply through the first and second water lines 218, 220. In this regard, the control panel 214 can independently actuate the first or second valve 302, 304, which can control the flow to the non-linear boom 104, and, as explained further below, can control the operation of the spray nozzles 1150 on the non-linear boom 104.

FIG. 3 also best shows the product pump 212 which receives product from the product feed line 204 and pumps product through the product supply line 224. The product supply line 224 runs along the main water line 216 and when it splits, runs along the first water line 218. Air compressor 208 further moves compressed air through air line 222, which runs along the main water line 216 and when it splits continues along the second water line 220. FIG. 3 further illustrates the product feed line 204 connected to the supply tank 206, which is positioned alongside the trailer 108. Control panel 214 can also be seen in FIG. 3. Control panel 214 includes an enclosure that contains all the circuitry and user interface systems required to control the operation of the spraying system 100.

FIG. 4 is a side view of a mixing truck 102 and a spraying system 100 of FIG. 1 illustrating the non-linear boom 104 of the spraying system 100 in the extended position such that the front end 130 of the non-linear boom 104 is positioned through the hopper 120 in the mixing drum 110 without contacting the interior sides of the mixing drum 110 or the helical ribbons 122 within the drum 110. As illustrated in FIG. 4, the non-linear boom 104 enters the interior of the mixing drum 110 through the access opening 410 in the hopper 120. As shown, the opening 410 of the hopper 120 is on the top of the mixing drum 110, which is in an angular relationship to the center or rotational axis 150 of the mixing drum 110. Thus, to access the interior of the mixing drum 110 through the opening 410 of the hopper 120 without hitting the interior of the mixing drum 110, the boom 104 must be non-linear and/or curved. The total radius of curvature of the non-linear boom 104 must be enough to avoid hitting the interior sides of the drum 110 and the helical mixing ribbon 122 toward the bottom of the mixing drum 110 upon entry but yet not so curved as to hit the helical mixing 122 ribbon or interior sides of the mixing drum 110 toward the top of the mixing drum 110 as the non-linear boom 104 extends through the hopper 120 and along the length of the mixing drum 110.

Figure 22:
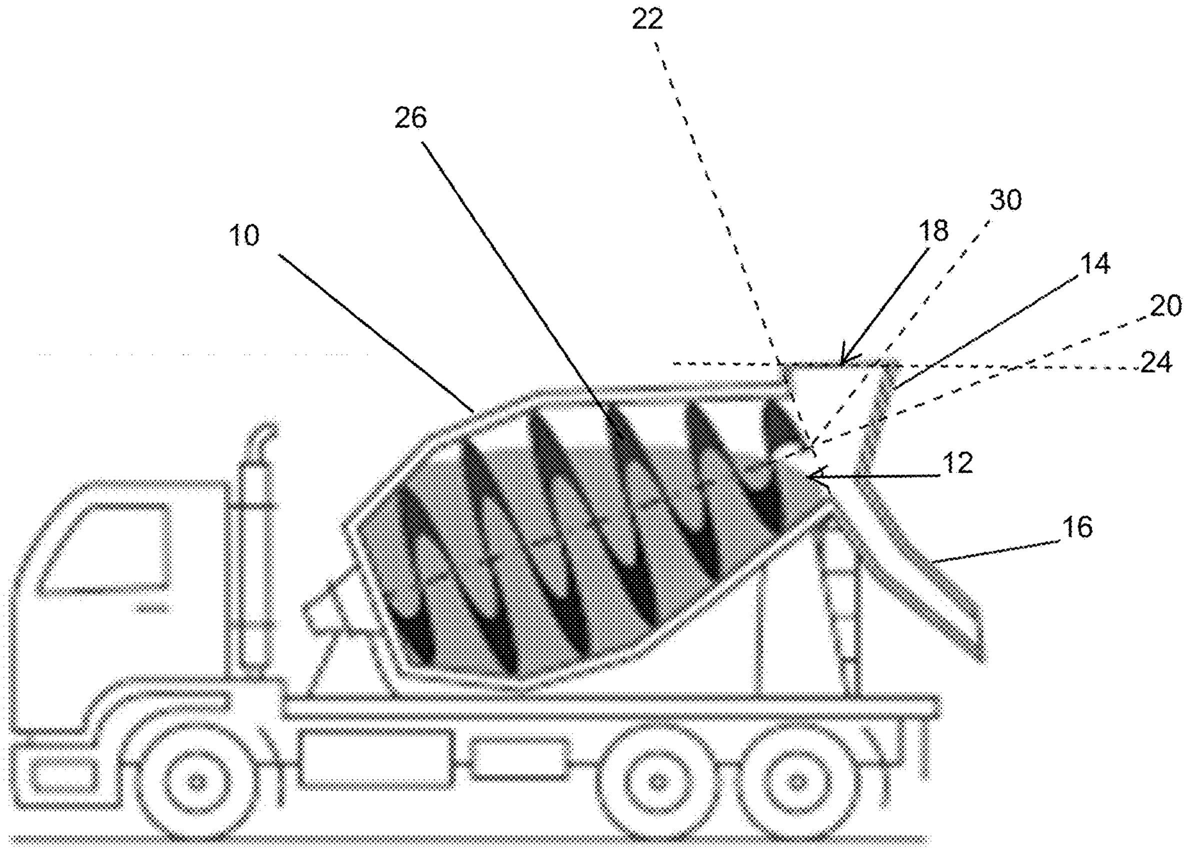
PRIOR ART FIGURE 22
FIG. 22 is a prior art figure of a rotational mixing drum on a mixing truck.

As further illustrated in FIG. 4, the first end 130 of the non-linear boom 104 is aligned with the top opening of the hopper 120 for entry into the interior of the mixing drum 110 using a support structure 106. In one example, the support structure 106 includes a boom support 105 attached to the support structure 106. In the example illustrated in FIG. 4, the support structure 106 is a movable support structure 106 that includes a scissor lift 402 for elevating the boom support 105 and for raising and lowering the non-linear boom 104. The boom support 105 further includes a support truss 404 positioned on the scissor lift 402 for supporting the non-linear boom 104. By using a scissor lift 402 to elevate the support truss 404, the scissor lift 402 is able to move and support truss 404 and assist with the alignment of the non-linear boom 104 with the access opening 410 of the hopper 120 on the mixing drum or container 110. As seen in the Prior Art FIG. 22, the hopper 120 is positioned over the opening to the mixing drum 110, which has a plane that is generally perpendicular to the center axis 150 of the drum 110. The support truss 404 has a guide system 406 mounted thereon for elevating and supporting the non-linear boom 104, as well as a drive mechanism 408 for retracting and extending the non-linear boom 104, as will be explained further below in connection with FIG. 6. The support truss 404 and guide system 406 together function to support, guide and move the non-linear boom 104 from a retracted to extended position.

In general, the non-linear boom 104 needs to be long enough to reach fully inside of the mixing drum across its interior length, while still being fully engaged with the boom support 105. In the present example, the non-linear boom 104 is approximately 300 inches in length, but may vary in length from 250 inches to 450 inches without departing from the scope of the invention. Further, given that concrete mixing trucks come in various sizes and lengths, e.g., 6, 10, and 14 cubic yard mixing drums, the total bend angle or radius of curvature of the non-linear boom 104 may need adjusted for varying applications. However, in most cases, the total angle of curvature required by the non-linear boom 104 is between 45 and 135 degrees with approximately 58-60 degrees preferred for large mixing drums, with radius of curvature of between 90 and 500 inches, with a radium of curvature of 96 inches working well for smaller containers and 480 inches for larger containers. Those skilled in the art will, however, recognize that the curvature or bend angle may need adjusted based upon the size and length of an individual mixing drum 110 or container and the angular relationship of the entry opening leading to the interior and center axis of the container, without departing from the scope of the invention.

Figure 5:
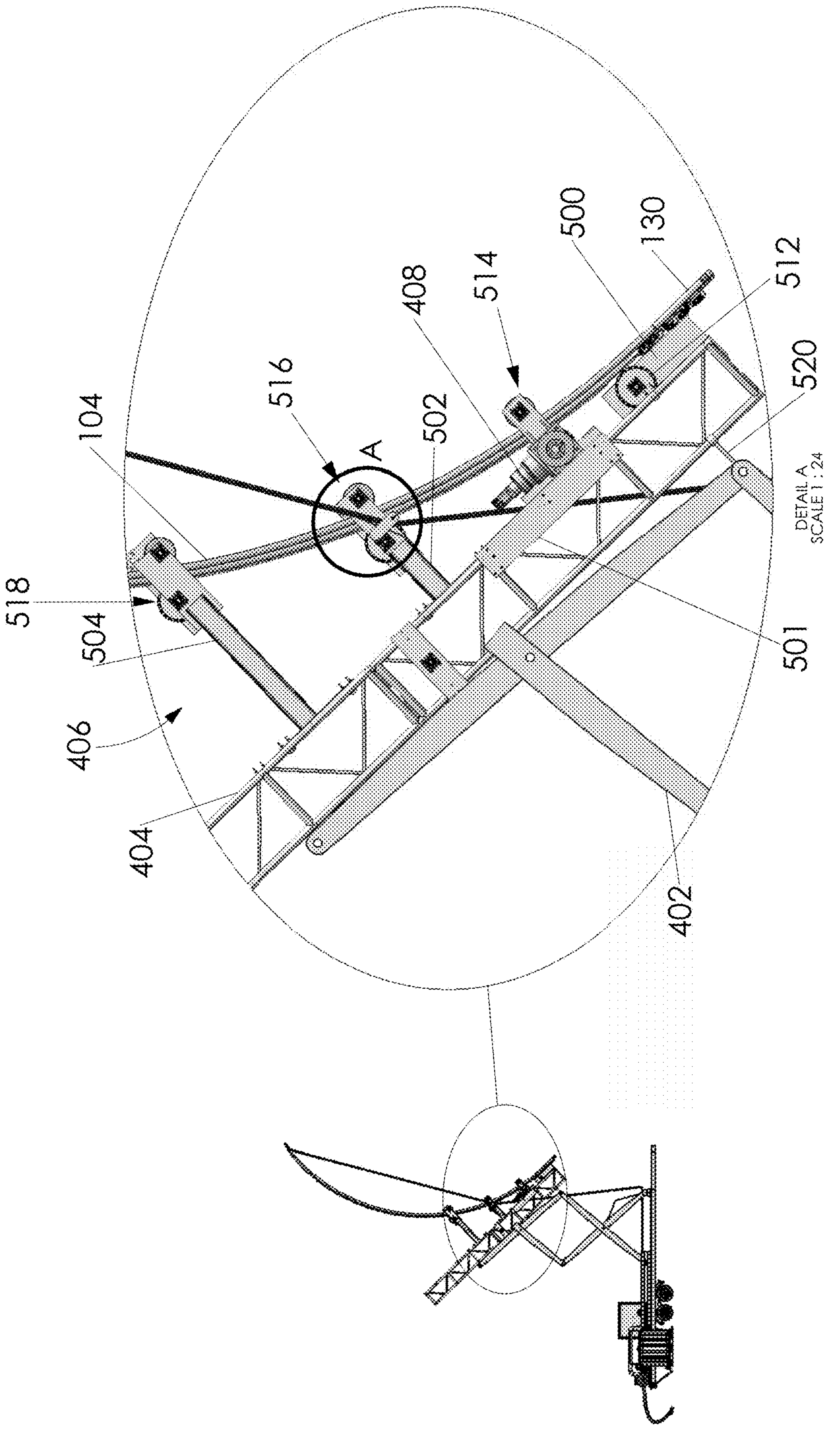
FIG. 5 is an enlarged detailed view of a portion of the truss support and guidance system of the spraying system of FIG. 1.

FIG. 5 is an enlarged view of a portion of the support truss 404 and guide system 406 for the non-linear boom 104 of the spraying system 100 of FIG. 1. The support truss 404 and guide system 406 (i.e., boom support 105) may be mounted on a scissor lift 402 at an angle relative to the surface supporting a scissor lift 402.

As illustrated, a support truss 404 is mounted atop a scissor lift 402. The boom support 105 and, accordingly, the support truss 404 and guide system 406, is mounted on the support structure 106 at an angle relative to the surface supporting the support structure 106. For example, the angle of entry through the hopper 120 into the interior of the mixing drum 110 is approximately 20 to 50 degrees relative to the center axis or rotational axis of the mixing drum 110. The center or rotational axis of the mixing drum 110, when on a mixing truck, is positioned at an approximate 12-15 degree angle on the bed of the truck 102. Thus, the support structure, in this application, supports the boom support 105 at an angle that is approximately 35 to 65 degrees relative to the ground or trailer of the mixing truck 102, with an optimal angle of approximately 45 degrees.

As seen in FIGS. 1 and 4, by angling the boom support 105, the guide system 406 supports the non-linear boom 104 at an angle relative to the center axis 150 of a mixing drum 110 on the mixing truck 102. In this manner, when the mixing truck 102 is properly aligned with the spraying system 100, the front end 130 of the non-linear boom 104 is aligned with the access opening in the hopper 120 of the mixing drum 110 to allow the non-linear boom 104 to extend through the mixing drum 110 generally following the centerline or rotational axis 150 of the mixing drum 110 thereby avoiding contact with the interior sides of the mixing drum 110 or the helical ribbons 122.

To assist with supporting the non-linear boom 104, a front bracket 500, drive platform 501, and first and second vertical beams 502 and 504 are positioned on the support truss 404. The vertical beams 502 and 504 are mounted perpendicular to the support truss 404 to support the non-linear boom 104. As illustrated in the figures, the non-linear boom 104 in the illustrated example is curved and supported on the support truss 404 guide system 406 in a convex manner, such that the upward surface of the non-linear boom 104 is curved like the exterior of a circle or sphere. Retaining mechanisms 514, 516 and 518 are further provided on the drive platform 506 and first and second vertical beams 502 and 504 to further guide and support the non-linear boom 104. A front chain gear 512 is also mounted near the front end 130 of the non-linear boom 104 on the front bracket 500 to further guide the non-linear boom 104 when being extended and retracted.

Given the curved shape of the non-linear boom 104, the vertical beams 502 and 504 vary in length, with the rearward or second support beam 504 being the longest or tallest. More particularly, the length of the vertical beams 502 and 504 shorten as they approach the front of the support truss 404 so that the front end 130 of the non-linear boom 104 can align with the opening 410 of the hopper 120 of the mixing drum 110 on the mixing truck 102 to extended into the interior of then mixing drum 110. While FIG. 5 illustrates the use of two vertical beams 502 and 504, those skilled in the art will recognize that more or less than two vertical beams be used to support the non-linear boom 104 without departing from the scope of the invention.

Figure 5A:
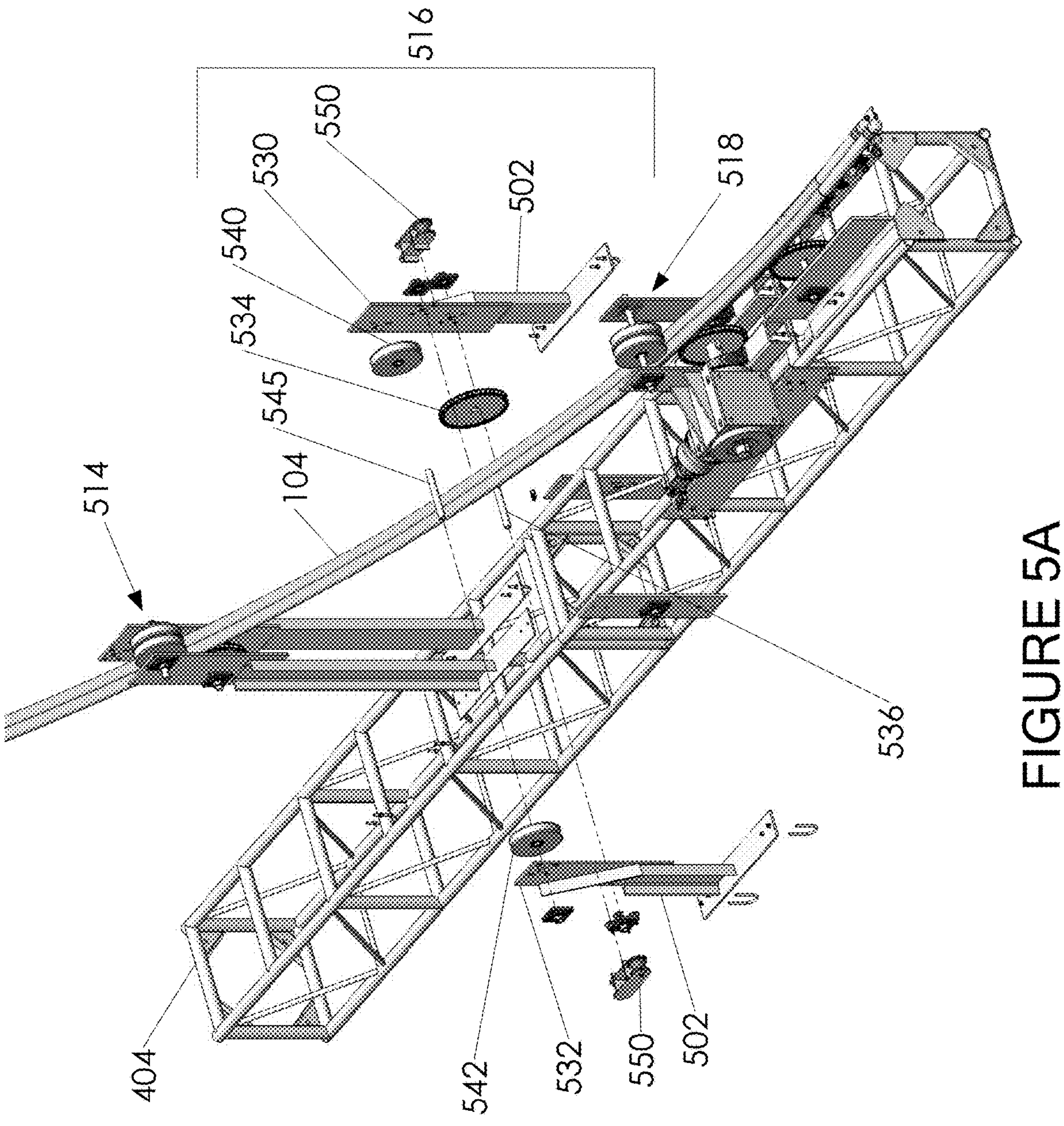
FIG. 5A is an exploded view of a retaining mechanism of the guidance system of FIG. 5.

The guide system 406 further includes retaining mechanisms 514, 516 and 518 for providing dynamic and sway support for the non-linear boom 104. FIG. 5A is an exploded view of one retaining mechanism 516. Although FIG. 5A only shows an exploded view of retaining mechanism 516, retaining mechanisms 514 and 518 include like parts and function to engage and guide the non-linear boom 104 in the same manner, using the same structural elements. Retaining mechanism 516 includes a left plate 530 anchored to the left side of the vertical beam support 502 and right plate 532 anchored to the right side of the vertical beam support 502. Positioned between the left plate 530 and right plate 532 near the top of the vertical beam support 502 (at the bottom the retaining mechanism 516) is a chain gear 534 maintained by a pin or rod 536 extending through the center of the chain gear 534 and in engagement with at least one or both of the left plate 530 or right plate 532 to allow the chain gear 534 to freely rotate between the left plate 530 and right plate 532. Positioned above the chain gear 534 are support rollers 540, 542, which could also be combined into a single support roller, that are also connected to the right and left plates 530, 532 respectively, using the pin or rod connection 545 to allow the support roller 540 to freely rotate. The vertical spacing or separation between the chain gear 534 and the support roller 540 is a distance that is equivalent to the height of the non-linear boom 104 such that the chain gear 534 engages the drive rack 604 (FIG. 6) of the non-linear boom 104 and the support rollers 540, 542 engage the top of the first and second water conduits 702 and 704, respectively (FIG. 7). Also shown on FIG. 5A are the channels 550 positioned on the left plate 530 and right plate 532 for guiding the first and second flexible water lines 702 and 704 and compressed air 222 and product supply line 224 to the back end 140 of the non-linear boom 104 without interference with the support structure 106 as the non-linear boom 104 moves from a retracted to extended position.

FIG. 5 also shows a truss lift 520, which raises the front end of the truss support 404 away from the scissor lift 402 such that the truss support 404 is maintained in angular relationship to the scissor lift 402. The truss support 404 may be a stationary support member that maintains the truss support 404 in a fixed angular relationship to the scissor lift 402. Alternatively, the height of the truss support 404 may be adjusted either manually or in an automated manner controlled by the control panel 214 to help more precisely align the front end 130 of the non-linear boom 104 with the access opening in a container, such as the hopper 120 of the mixing drum 110.

Figure 6:
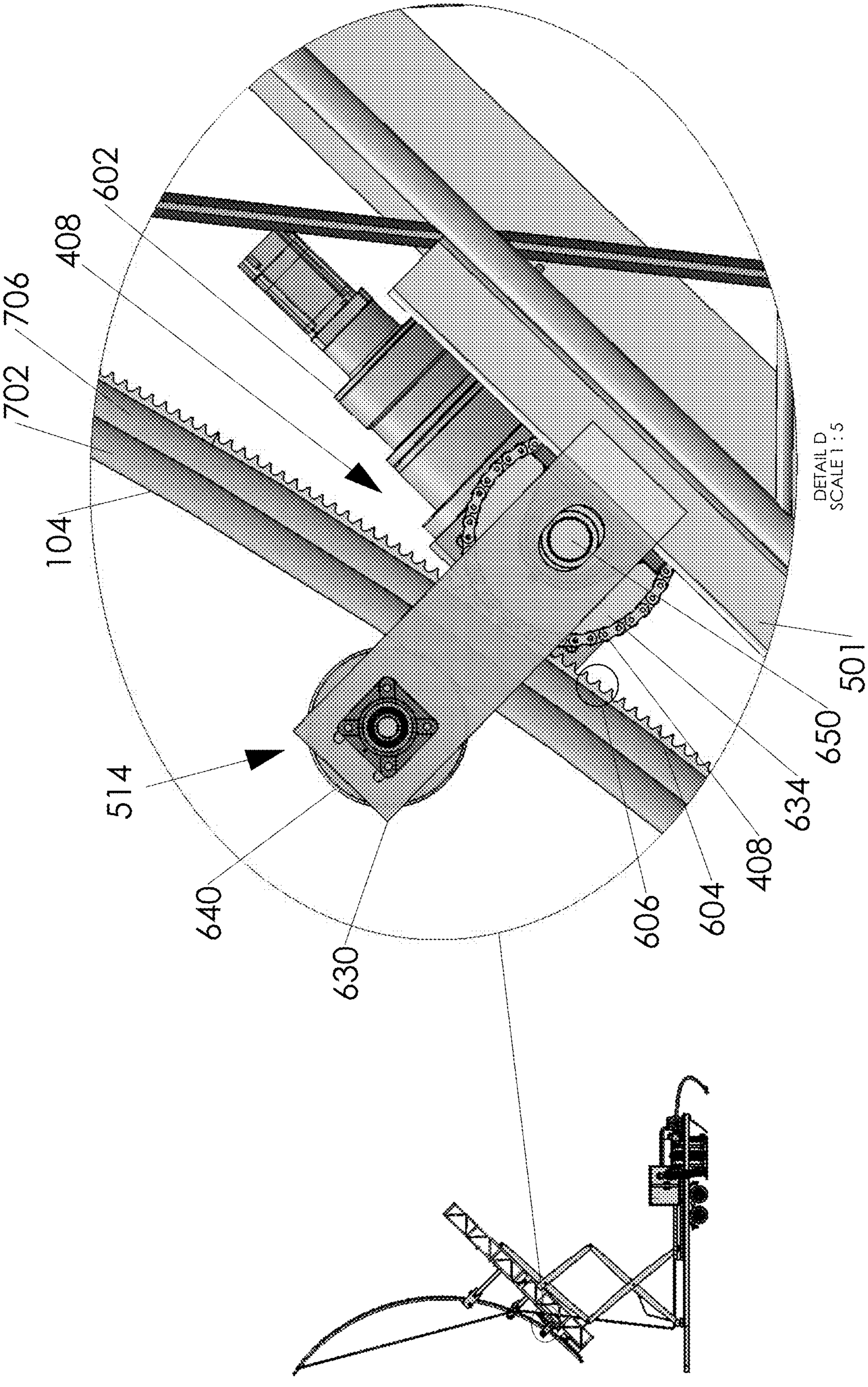
FIG. 6 is a further enlarged view of a portion of the truss support and guidance system of the spraying system of FIG. 1 that drives the non-linear boom from a retracted to an extended position.
Figure 7:
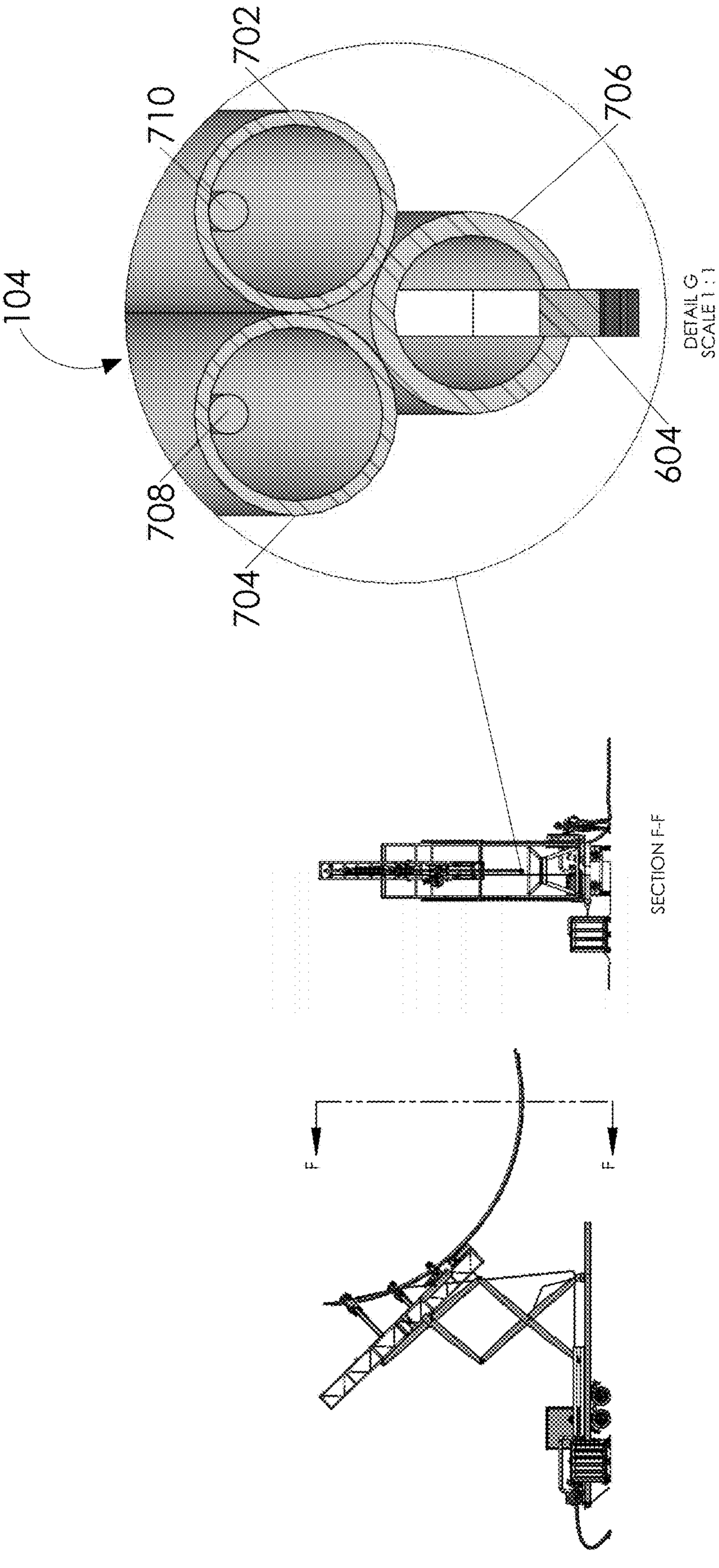
FIG. 7 is a cross-section of the non-linear boom of FIG. 1 taken along line A-A.

FIG. 6 is a further enlarged view of a portion of the truss support 404 and guidance system 406 of the spraying system 100 of FIG. 1 that drives the non-linear boom 104 from a retracted position (FIG. 1) to an extended position (FIG. 4). As discussed previously, the drive mechanism 506 is on a drive platform 501, which supports the retaining mechanism 514 on the support truss 404. The retaining mechanism 514 is similar to the retaining mechanism of 516 in that it includes a right plate (not shown) and left plate 630 mounted to the drive platform 501 having a chain gear 634 and support roller 640 rotatably mounted to the right plate and left plate 630. Here, however, a reversible motor 602 is mounted on the drive platform 501 in communication with chain gear 634. The chain gear 634 is connected to the drive shaft 650 of the motor 602. As shown, when the non-linear boom 104 is positioned between the chain gear 634 support roller 640, the chain gear 634 engages the teeth 606 of the drive rack 604. In this regard, the non-liner boom is able to move from a retracted to extended position when the motor is operated in one direction and from an extended to retracted position when the motor is operated in the opposing direction.

FIG. 7 is a cross-section of the non-linear boom 104 of FIG. 1 taken along line A-A. In this example of an implementation, boom 104 is comprised of three rigid conduits 702, 704 and 706 (or pipes or tubes). As will be explained in further detail below, two of the three conduits 702, 704 are used for transporting pressurized water through the non-linear boom 104 to spray the interior of a container, such as the mixing drum 110. These two conduits 702 and 704 are positioned side-by-side and comprise a first water conduit 702 and a second water conduit 704. Centered directly underneath the first and second water conduit 702, 704 is third bottom conduit 706. This third bottom conduit 706 carries and protects all the necessary electrical wiring (not shown), including the condensed air line 222 and the product line 224. Also included within each first and second water conduits 702, 704 is an internal reinforcement bar 708, 710, respective, which runs the length of the first and second water conduits 702, 704. These internal reinforcement cables/wire ropes 708, 710 help maintain the conduits in their original non-linear state, as will be explained further below, by applying rigidity to the first and second water conduits 702, 704. Positioned below the third bottom conduit 706 is a drive rack 604, the teeth of which engage the chain gear 634 on the drive motor 602. Those skilled in the art will recognize that the conduit pipes 702, 704 and 706 are not limited to the illustrated configuration and may be largely interchangeable. Thus, the attachment of the drive rack 604, if positioned on the bottom, is not necessarily limited to the attachment to the third bottom conduit 706. The drive rack 604 could be attached to either the first or second water conduits 702, 704, or between the first and second water conduits 702, 704, if for example, the third bottom conduit 706 is positioned above the first and second water conduits 702, 704 rather than below the first and second water conduits 702, 704. Further, the drive rack 604 may be positioned on the top of the non-linear boom 104 rather than the bottom of the non-linear boom 104 with support rollers positioned on the underside of the non-linear boom 104.

In this example, the conduits are approximately 2 inches in diameter, making the total width of the conduits on the non-linear boom 104 approximately 4 inches. When the hopper 120 is positioned on the mixing drum 110, it has been found that the opening to the mixing drum 110 through the hopper 120 can be as small as 11 inches, thereby prohibiting a non-linear boom 104 of a larger width from entering the mixing drum 110. The opening in the mixing drum 110 when the hopper 120 is attached is too small for larger booms to pass. Some mixing trucks 102 may have larger openings into the mixing drum 110 through the hopper 120 allowing for the non-linear boom 104 to be larger in width; however, utilizing a boom 104 having a front end of not more than 5 inches (including the spray nozzles 1150) allows for a more universal use of the spraying system 100 of the present invention in most all mixing trucks 102. It is recognized that if the spraying system 100 is designed for use with a different application or containers with larger openings into the container, the total width of front end of the boom 104 may be larger than 5 inches.

Figure 8:
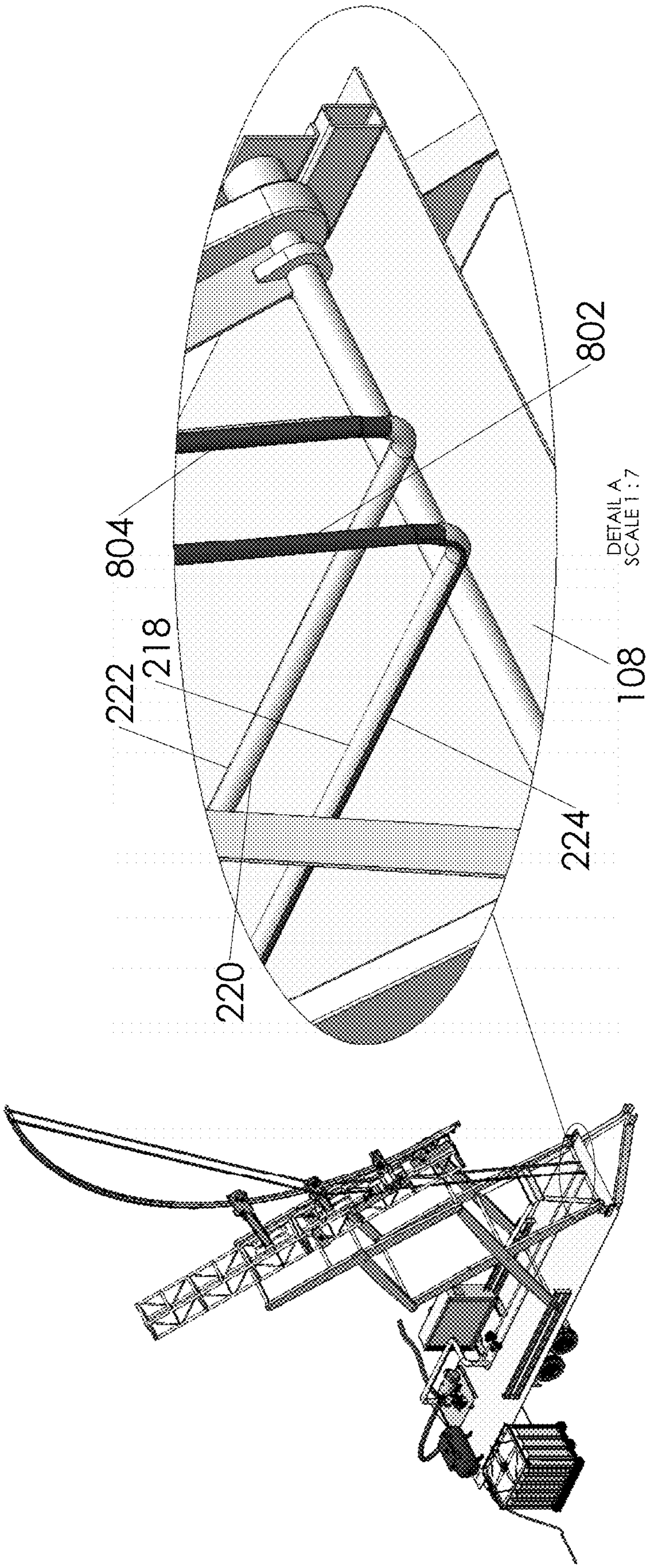
FIG. 8 is an enlarged detailed view of the first and second water lines as they transition off the trailer to the back end of the non-linear boom.

FIG. 8 is an enlarged detailed view of the first and second water lines 218, 220 as they transition off the trailer 108 upward toward to the back end 140 of the non-linear boom 104. As illustrated in the figures, the water lines 218, 220 extend from the rear of the mobile vehicle 108 where they split from the main water line 216 toward the front of the trailer 108. First and second water lines 218, 220 are rigid water lines as they run across the bed of the vehicle 108. As the water lines reach the end of the trailer 108, they are required to extend upward toward the back end 140 of the non-linear boom 104. FIG. 8 illustrates the first and second water lines 218, 220 transitioning to a first flexible water line 802 and second flexible water line 804 as they extend upward to feed water to the non-linear boom 104. FIG. 8 also illustrates the product supply line 224 that runs alongside the first water line 218 and that continues to run along the first flexible water line 802 to the back end 140 of the non-linear boom 104. Similarly, the compressed air line 222 that runs alongside the second water line 220 and continues to run along the second flexible water line 804 to the back in 140 of the non-linear boom 104.

Figure 9:
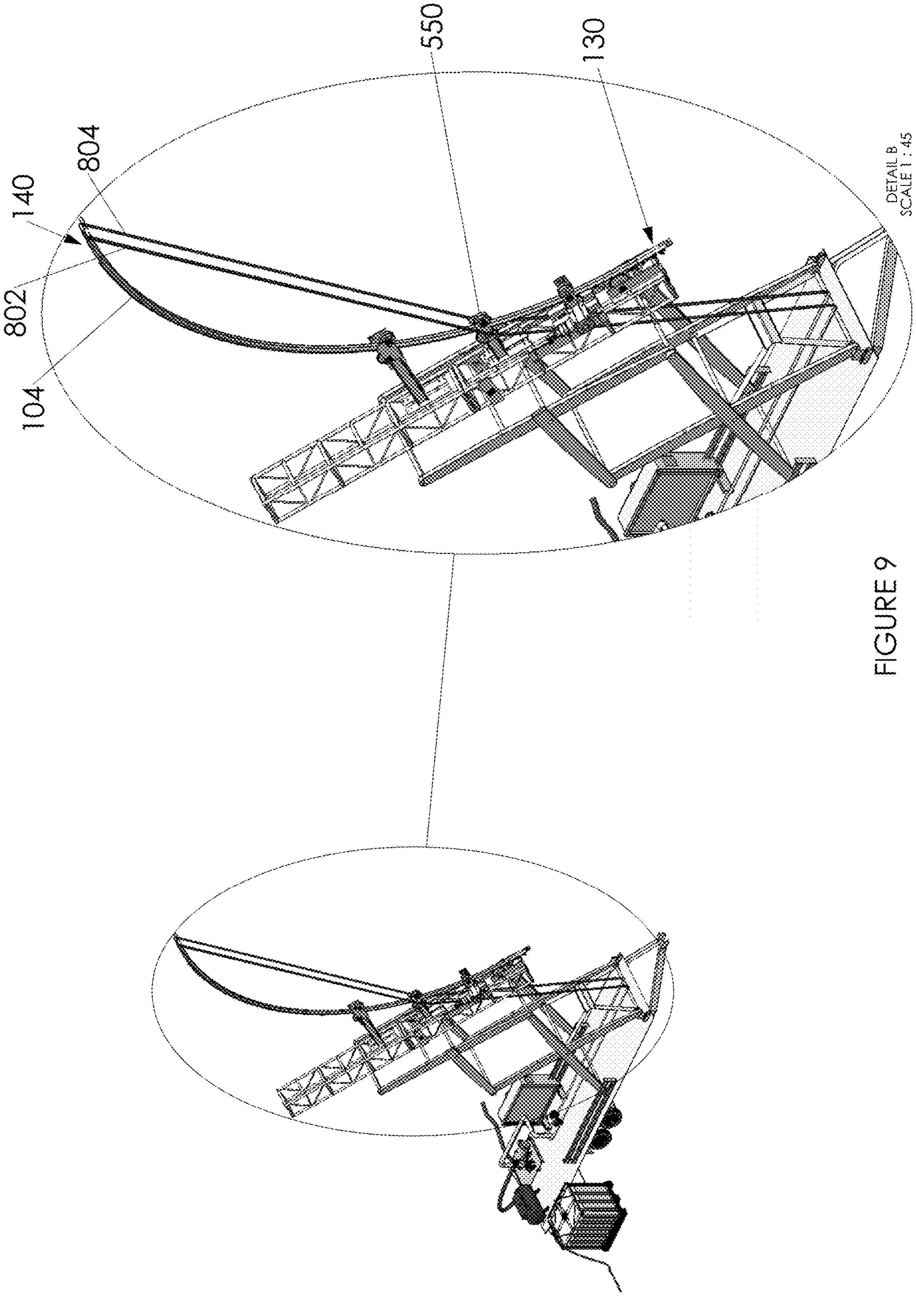
FIG. 9 is an enlarged detailed view of the flexible water lines extending upward through the support structure to the back end of the non-linear boom.

FIG. 9 is an enlarged detailed view of the flexible water lines 802, 804 extending upward through the movable support structure 106 to the back end 140 of the non-linear boom 104. As shown in FIG. 9, the first and second flexible water lines 802, 804 extend up to the back end 140 of the non-linear boom 104. In this example, the first flexible water line 802 is guided toward the back end 140 of the non-linear boom 104 for attachment to the non-linear boom 104 without interference with other movable parts of the spraying system by channels 550 (FIG. 5A) positioned on the left and right plates 530, 532 of the retaining mechanism 516.

Figure 10:
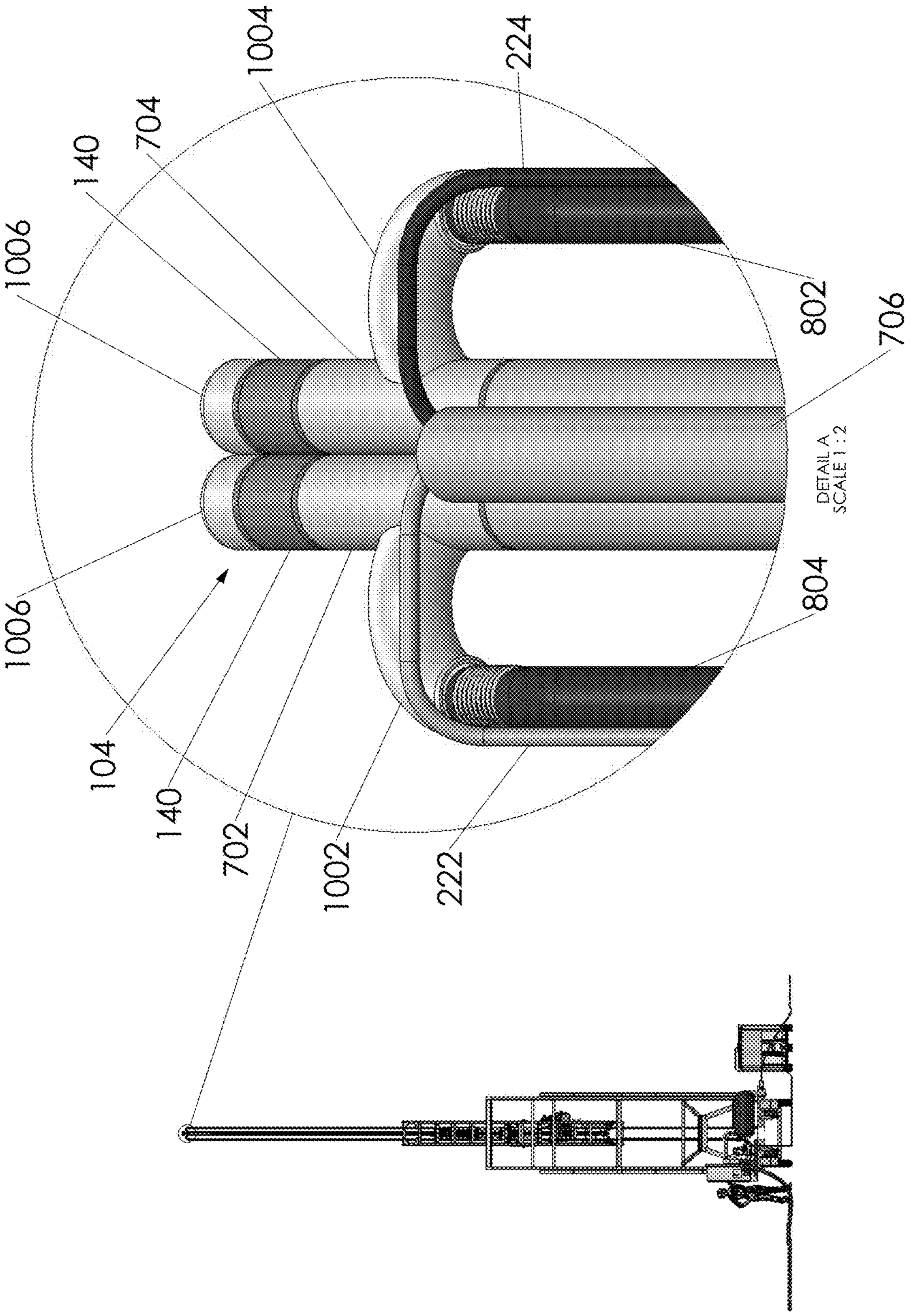
FIG. 10 is an enlarged view of the back end of the non-linear boom illustrating the connection of the flexible water lines to the non-linear boom and the compressed air line, product supply line and electrical lines feeding into a bottom conduit on the non-linear boom.

FIG. 10 is an enlarged view of the underside of the back end 140 of the non-linear boom 104 illustrating the connection of the flexible water lines 802, 804 to the non-linear boom 140 and the running of the compressed air line 222, product supply line 224, and electrical wires (not shown) into the bottom conduit 706. Although not shown in FIG. 9, the compressed air line 222 continues to run alongside the first water line 218 as it transitions upward into a first flexible water line 802 to the top of the back end 140 of the non-linear boom 104. Similarly, the product supply line 224 continues running along the second water line 220 to the second flexible water line 804 and to the back end 140 of the non-linear boom 104. As illustrated in FIG. 10, when the first and second flexible water lines 802, 804 and the compressed air line 222 and product supply line 224 reached the back end 140 of the non-linear boom 104, flexible water line 802 is connected to the first water conduit 702 via a flexible hose connection 1002. The second flexible water line 804 is similarly connected to the second water conduit 704 with a flexible hose connection 1004 extending from the second water conduit 704 at the back end 140 of the non-linear boom 104. As also seen FIG. 10, both the first and second water conduits 702, 704 are capped at the back end 140 of the non-linear boom 104 with end caps 1006. The compressed air line 222 and the product supply line 224, along with all necessary electrical wires (not shown), are then carried by the bottom conduit 706.

Figure 11:
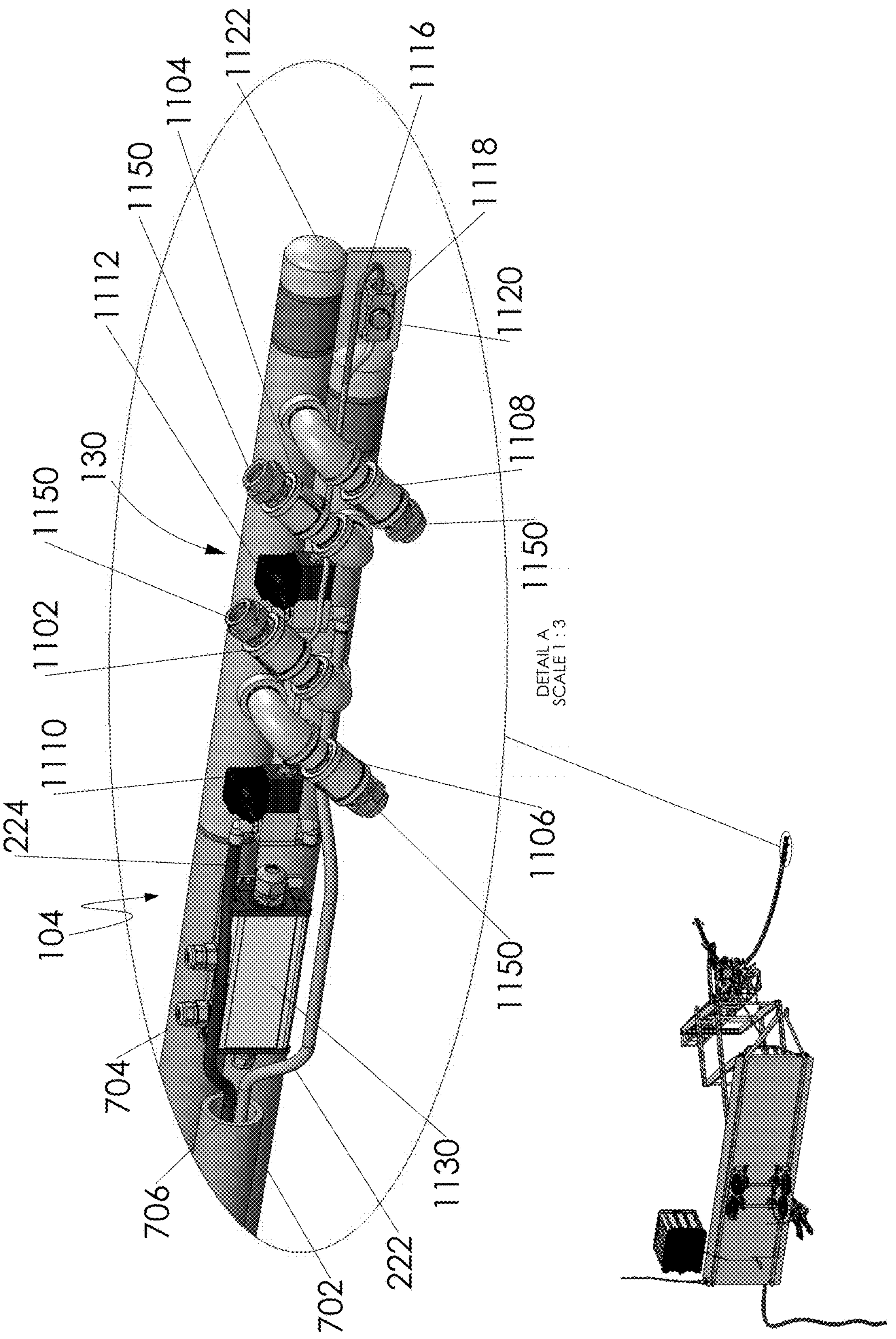
FIG. 11 is an enlarged view of the underside of the front end of the non-linear boom.

FIG. 11 is an enlarged view of the underside of the front end 130 of the non-linear boom 104. As illustrated, forward-facing water discharge pipes 1102 and 1104 are connected to the first water conduit 702, while the aft-facing water discharge pipes 1106 and 1108 are attached to the second water conduit 704. The first water conduit 702 carries pressurized water to the forward facing discharge pipes 1102 and 104, which are positioned sideways toward the front, and the second water conduit 704 carries pressurized water to the aft facing water discharge pipes 1106 and 1108, which face sideways toward the back. Spray nozzles 1150 are then connected to the forward facing discharge pipes 1102, 1104 and aft-facing water discharge pipes 1106 and 1108.

The spray nozzles 1150 may all be the same, for example, they may all be solid stream nozzles, or they may all be fan nozzles. Alternatively, the spray nozzles 1150 may be any combination of spray nozzles 1150, for example, using both solid stream nozzles and fan nozzles positioned such that one of each is positioned sideways and forward and sideways and backward or positioned such that each types is facing the same direction. Further, while the present example shows the spray nozzles 1150 and water discharge pipes 1106 and 1108 positioned on the bottom side of the front end of the boom 104, the spray nozzles 1150 and water discharge pipes 1106 and 1108 may be positioned anywhere near the front 130 of the boom 104, for example, on the sides, top, or bottom, or any combination thereof, without departing from the scope of the invention.

As further illustrated in FIG. 11, the bottom conduit 706 does not extend the full length of the non-linear boom 104. Prior to reaching the first aft-facing water discharge nozzle 1102, the bottom conduit 706 terminates. The product supply line 224 and compressed air line 222 running through the bottom conduit 706 exit the bottom conduit 706. The product supply line 224 is then connected to a product supply valve 1110 mounted on the underside of the first and second water conduits 702, 704. Similarly, the compressed air line 222 connects to a compressed air valve 1112 also mounted on the underside of the first and second water conduits 702, 704. Compressed air from the valve 1112 is then transferred through airline 1116 to an atomizing nozzle 1118 which is mounted on a plate 1120. In this example, the first water conduit 702 terminates before the second water conduit 704 to allow for the plate 1120 and atomizer 1118 to be affixed to the end of the first water conduit 702 without extending beyond the end of the second water conduit 704. Also mounted on the underside of the first and second water conduits 702 and 804 after the termination of the bottom conduit 706 is an electrical junction box 1130 for protecting and organizing the electrical wires required to operate, for example, the product supply valve 1110 and the compressed air valve 1112. Additionally, although not shown, sensors may also be placed on the front end 130 of the non-linear boom 104 that are communication with the control panel 214 to sense the proximity of the non-linear boom 104 relative to the access and/or container opening and its interior walls and components. In this example, sensors may be used to sense the proximity of the non-linear boom 104 relative to the access opening on the hopper 120 and the opening on the mixing drum 110 and to sense the proximity of the non-linear boom 104 relative to the interior sidewalls of the mixing drum 110 and the helical ribbons 122 within the mixing drum 110 and to avoid the non-linear boom 104, its spray nozzles 1150 and other component parts from contact any party of the hopper 120 or mixing drum 110 and the helical ribbons 122 within the mixing drum 110.

Figure 12:
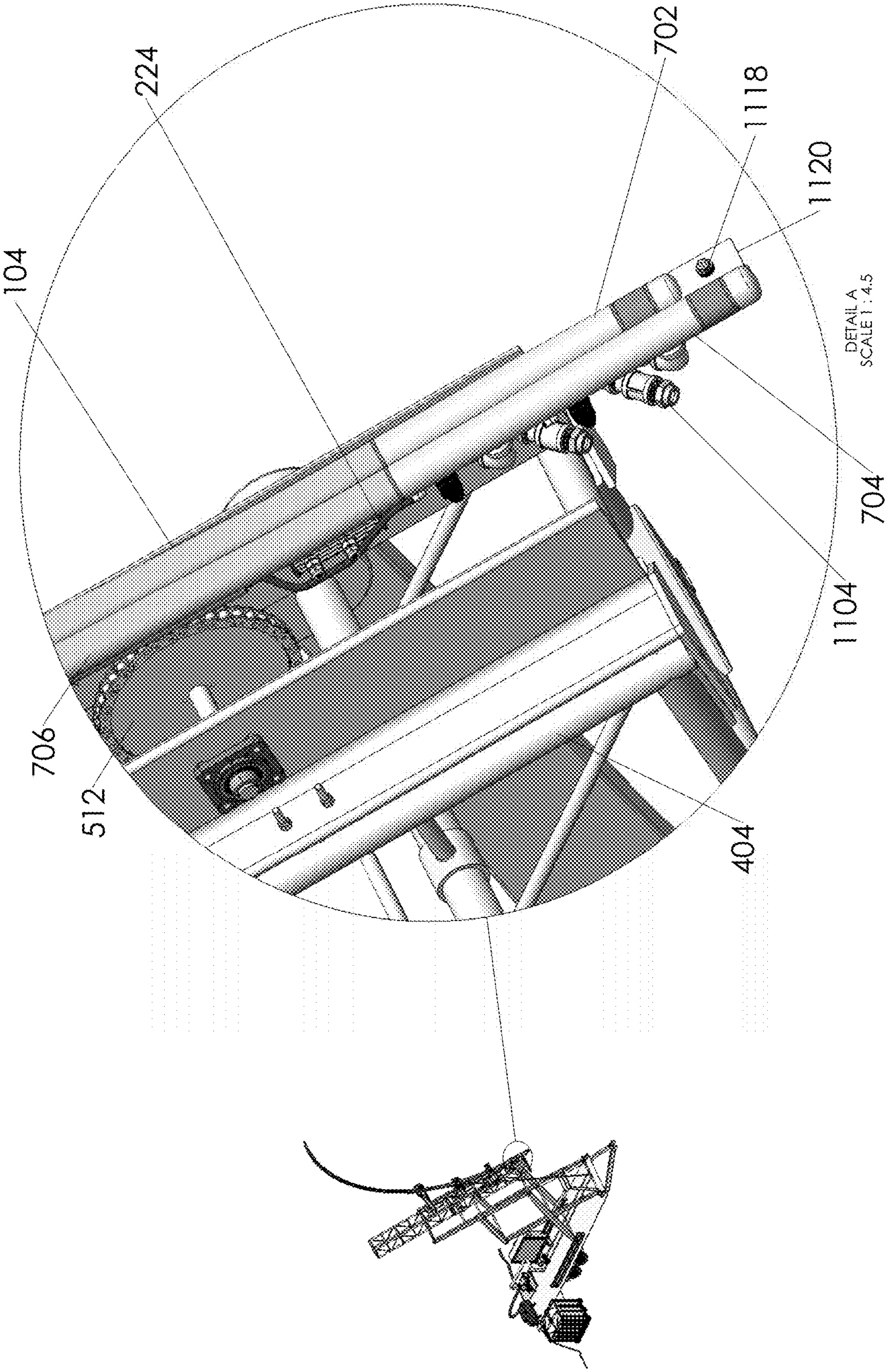
FIG. 12 is an enlarged view of the front end of the non-linear boom illustrating the sideways and forward-facing water discharge pipes, spray nozzles and atomizer.

FIG. 12 is an enlarged view of the top left side of the front end 130 of the non-linear boom 104 illustrating the forward-facing water discharge pipes 1102, 1104 and the product atomizer 1118 mounted on plate 1120. Also illustrated in FIG. 12 is the front gear chain 512, which aligns with the drive rack 604 on the underside of the bottom conduit 706 to guide the front end 130 of the non-linear boom 104 from its extended and retracted positions. FIG. 12 also illustrates the bottom conduit 706 terminating before the end of the non-linear boom 104 to allow for the product supply line 218 to exit the bottom conduit 706 to supply product to the atomizing nozzle 1118.

Figure 13:
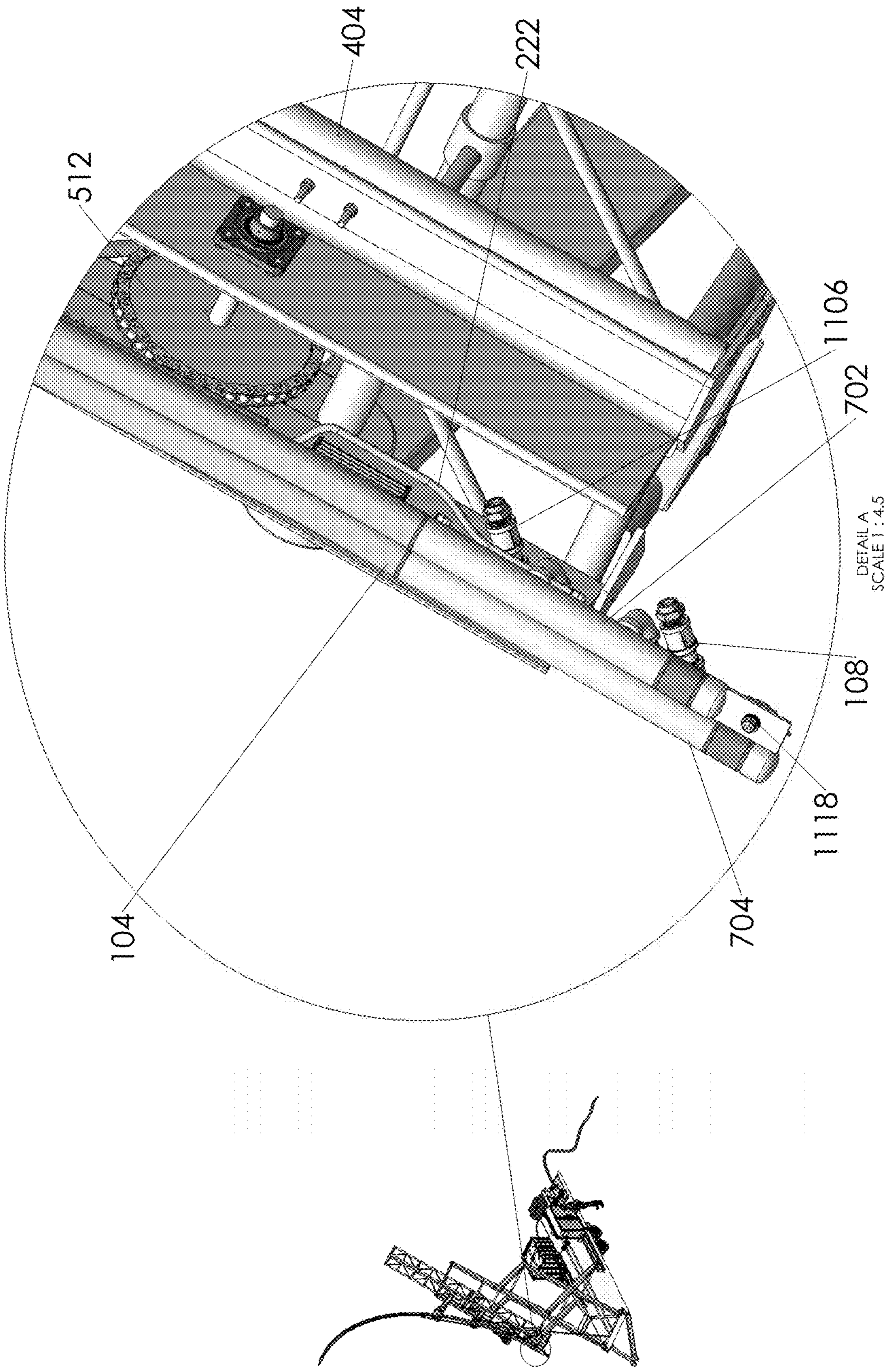
FIG. 13 is an enlarged view of the front end of the non-linear boom illustrating the sideways and aft-facing water discharge pipes.

FIG. 13 is an enlarged view of the top right side of the front end 130 of the non-linear boom 104 illustrating the aft facing water discharge pipes 1106 and 1108 and the product atomizer 1118. FIG. 13 also illustrates the front gear chain 512, which aligns with the drive rack 604 on the underside of the bottom conduit 706. While FIG. 13 illustrates the drive rack 604 on the third bottom conduit 706, the drive rack 604 could also be positioned on the top of the non-linear boom 104 or on another component of the non-linear boom 104 if the configuration of the conduits/pipes 702, 704 and conduit/pipe 706 of the boom 104 are arranged differently. FIG. 13 also illustrates the early termination of the bottom conduit 706 allowing for the compressed air line 222 to exit the bottom conduit 706 to supply compressed air to the atomizing nozzle 1118.

Figures 14, 15:
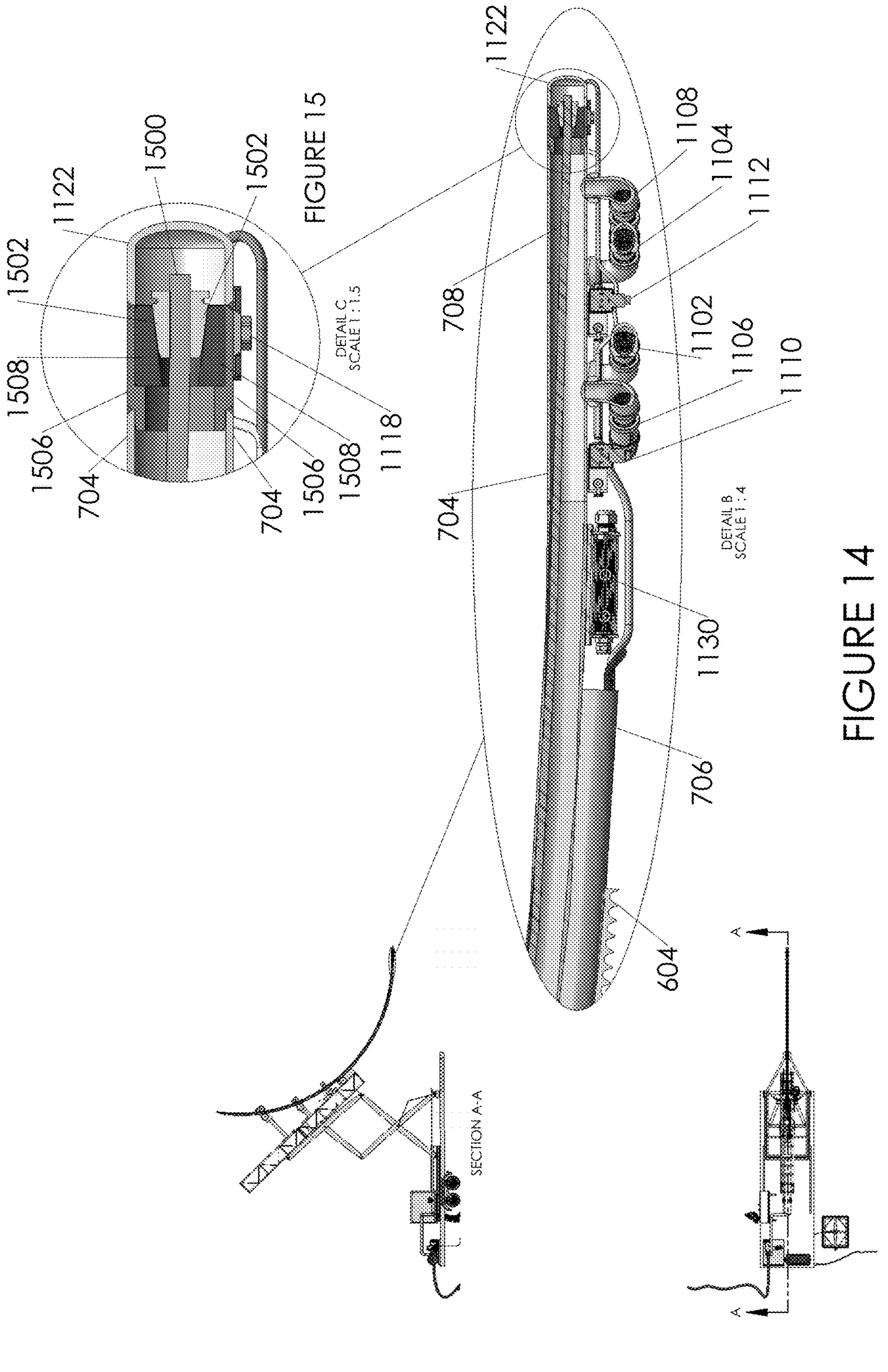
FIG. 14 is a cross-section of the front end of the non-linear boom taken longitudinal across the second water conduit of the non-linear boom.
FIG. 15 is an enlarged view of section A of FIG. 14.

FIG. 14 is a cross-section of the front end 130 of the non-linear boom 104 taken across the longitudinal axis of the second water conduit 704 of the non-linear boom 104. FIG. 14 illustrates the internal reinforcement bar 710 running the length of the second water conduit 704 and terminating at the end 1122 of the non-linear boom 104.

FIG. 15 is an enlarged view of section A of FIG. 14. FIG. 15 shows the use of a tensioning wedge 1500 to maintain the internal reinforcement cable/wire rope 710 in tension. Although not shown, the tensioning wedge 1500 is used at the terminal ends of both the first water conduit 702 and second water conduit 704 to maintain the internal reinforcement cable/wire rope 708, and 710 in tension, to maintain the conduit rigidity used in the first water conduit 702 and second water conduit 704, as well as the bottom conduit 706, in a non-linear state creating the non-linear boom 104. The tensioning wedge 1500 includes a wedged sleeve 1502 which is positioned on the end of the internal reinforcement bar 710. The internal reinforcement cable/wire rope 710 with the wedged sleeve 1512 is inserted in a second reversed wedged sleeve 1504. As illustrated, the second reversed wedged sleeve 1504 is held in place within the end of the second water conduit 704 by a ledge 1508 on an interim tubular section 1506 positioned between the end 1122 and the second water conduit 704. Again, the tensioning wedge 1500 may be used in the terminal ends of all the water conduits in the non-linear boom 104, or alternative. in the terminal ends of one or more of the first, second and third conduits 702, 704, and 706.

Figure 16:
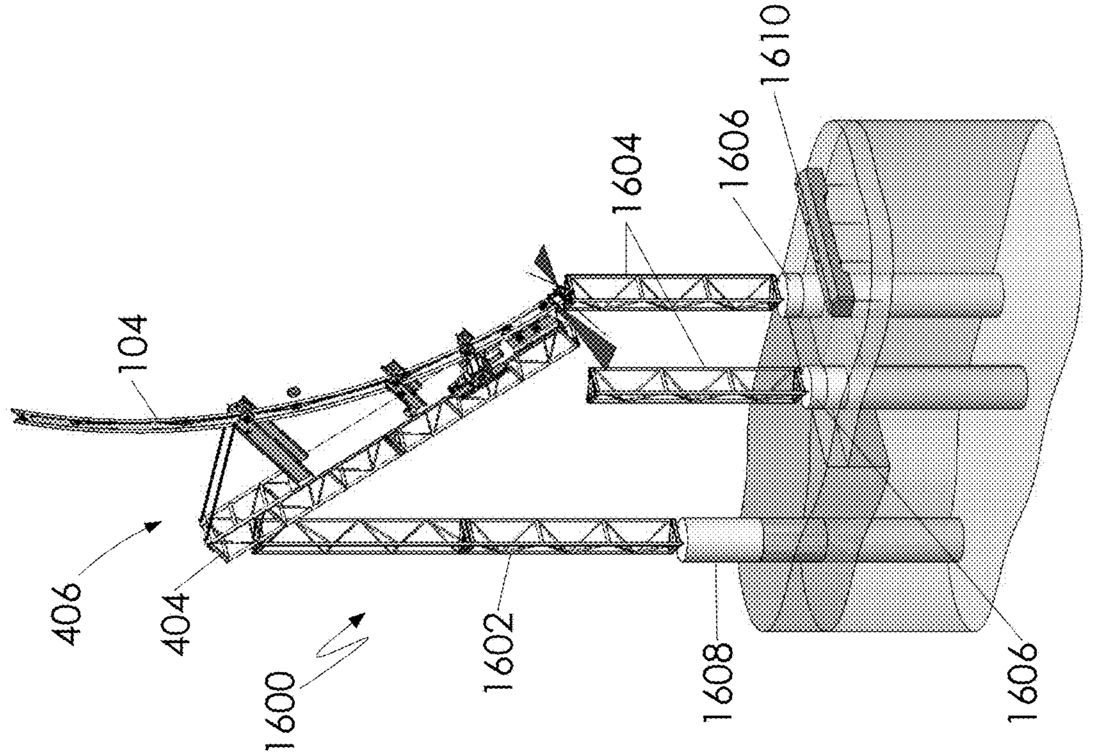
FIG. 16 as a side perspective view of another example of an implementation of a spraying system of the present invention aligned with a drum on a mixing truck where the spraying system is stationary.

While FIGS. 1-15 illustrate one example of a spraying system 100 mounted on a mobile vehicle 108, those skilled in the art will recognize that the spraying system 100 may be designed as a stationary or fixed spraying system 1600. FIG. 16 illustrates a side perspective view of another example of an implementation of a spraying system 1600 of the present invention where the spraying system 1600 is stationary and supported on forward and rear concrete piers 1606, 1608. Here, the non-linear boom 104 with guide system 406 is mounted on a support truss 404. In this example, the support truss 404 is elevated using three vertical truss supports—one rear truss member 1602, which can be comprised of one or more truss segments, and two forward vertical truss members 1604. Again, in this example, the rear truss member 1602 and two forward vertical truss members 1604 are supported by concrete support piers 1608 and 1606, respectively. Those skilled in the art will recognize that the construction of a stationary spraying system 1600 shown in FIG. 16 is only one example of a fixed support system to elevate the truss support 404 and guide system 406 with boom 104. Rather than using concrete support piers 1606, 1608 to support the spraying system 1600, a concrete slab may be used as the foundation to support the stationary spraying system 1600. Further, rather than using vertical truss supports to elevate and support the support truss 404, any type of column supports may be utilized (e.g., Concrete columns, I-beams, etc.). Additionally, rather than using fixed columns, a movable elevated support mechanism such a scissor lift may also be directly mounted on a concrete slab foundation to support the non-linear boom 104 in an elevated position on the stationary platform.

FIG. 17 is a side view of a mixing truck 102 and a spraying system 1600 of FIG. 16 illustrating the non-linear boom 104 of the spraying system 1600 in the extended position. As illustrated in FIG. 17, the stationary spraying system 1600 functions in a similar manner as the movable spraying system 100. The hopper 120 of the mixing truck 102 is aligned with the front end 130 of the non-linear boom 104, which as shown, can then be extended into the interior of the mixing drum 110 to spray medium on the interior of the mixing drum 110 and helical ribbon 122. The non-linear boom 104 can be slowly retracted using drive mechanism 408 to clean the interior of the mixing drum 110. As illustrated in FIGS. 16 and 17, a stop 1610 can be positioned in front of the spraying system 1600 to help align the mixing truck 102 with the front end 130 of the non-linear boom 104. The stop 1610 can also be used with a movable spraying system 100.

Figures 18, 19, 20, 21:
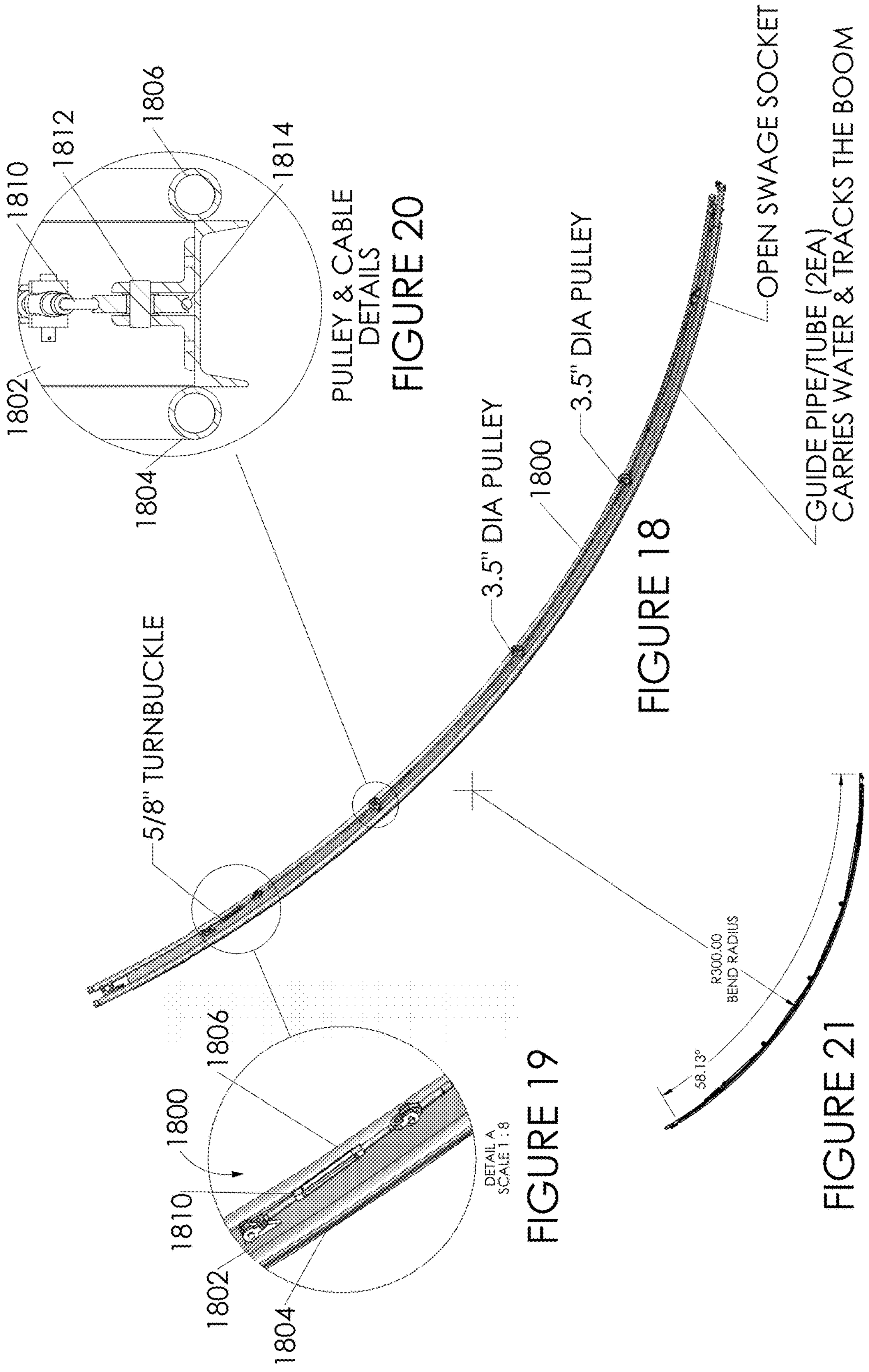
FIG. 18 is a top perspective view of an alternative example of an implementation of a non-linear boom for use with the spraying system of the present invention.
FIG. 19 is an enlarged top perspective detailed view of a section of the non-linear boom of FIG. 18.
FIG. 20 is a side view of the non-linear boom of FIG. 18 illustrating one example of an angle and radius of curvature of the boom.
FIG. 21 is a side view of the non-linear boom illustrating an example bend radius and a total angle of curvature.

FIG. 18 is a top perspective view of an alternative example of an implementation of a non-linear boom 1800 for use with the spraying system 100, 1600 of the present invention. FIGS. 19 and 20 are offer more detailed views of the non-linear boom 1800. FIG. 19 is an enlarged top perspective detailed view of a section of the non-linear boom 1800 of FIG. 18. FIG. 20 is a cross-section of the non-linear boom 1800 of FIG. 18 taken along line 20-20 of FIG. 18.

As illustrated in FIGS. 19 and 20, the non-linear boom 1800 includes a central channel 1802 having first and second flexible water conduit 1804 and 1806 positioned on each side of the central 1802. The central channel 1802 and first and second water conduits 1804 and 1806 are made of a rolled material to allow the boom to be non-linear at generally the same angular curve as boom 104, discussed above. In this example, to maintain the non-linear boom 1800 shape, a pulley system 1810 is positioned along the top of the central channel 1802 of the non-linear boom 1800. The pulley system includes pulleys 1812 (e.g., 3.5" diameter pulleys) spaced apart along the top of the central channel 1802 of the non-linear boom 1800 having a cable/wire rope 1814 (e.g., a ⅜-inch stainless steel cable). The cable/wire rope 1814 is then placed in tension by the turnbuckle 1810 to maintain the non-linear boom 1800 in a non-linear state. As illustrated in FIG. 21, which is a side view of the non-linear boom 1800, in this example, the angle of curvature of the boom 1800 is approximately 58 degrees with a radius of curvature of 300 inches.

The present invention further includes a method for spraying the interior of a container 110 with one or more types of medium when access to the interior container is angularly offset from the center line. In the case of a mixing drum, the method provides for spraying the interior of a container mixing drum 110 with one or more types of medium without requiring the removal or modification of the hopper 120 on the mixing drum 110. The method of the present invention includes the steps of providing a non-linear boom 104, 1800 having a front end, elevating the non-linear boom 104, 1800 at an angle relative to the surface supporting the mixing drum 110, for example from 35 to 65 degrees, such that the front end of the non-linear boom 104, 1800 is positioned over the top opening of the hopper 120 and extending the non-linear boom into the hopper 120 and into the interior of the mixing drum 110 through the opening in the mixing drum 110. The method further includes providing water discharge conduits 1102, 1104, 1106 and 1108 and spray nozzles 1150 on the front end of the non-linear boom 104, 1800 and positioning the front end of the non-linear boom 104, 1800 within the interior of the mixing drum 110. The step of elevating the non-linear boom at an angle relative to the surface supporting the mixing drum 110 requires the angle relative to the surface supporting the mixing drum to align with an angle from the top opening of the hopper 120 extending through the opening in the mixing drum 110 such that the non-linear boom 104, 1800 is able to be inserted through the top opening of the hopper 120 into the opening in the mixing drum 110 to advance through the interior of the mixing drum 110 generally along the central axis 150 of the mixing drum 110.

In operation, as described in the case of a mixing truck 102, the mixing truck 102 is aligned at its rear, or at its front in the case of the front loading mixer, with the spraying system 100, 1600 when the non-linear boom 104, 1800 is in a retracted position. When the mixing truck 102 is properly aligned with the spraying system 100, 1600 the front end of the non-linear boom 104, 1800 is positioned near the top opening of the hopper 120 affixed to the mixing drum 110 on the mixing truck 102. Because the boom support 105 is elevated by the support structure 106 in an angular manner relative to the ground upon which the mixing truck 102 and spraying system 100, 1600 rest, and further because the non-linear boom 104, 1800 is curved, the non-linear boom 104, 1800 is able to enter through the top of the hopper 120 on the mixing drum 110 and pass through the opening in the mixing drum 110, which is in communication with the hopper 120, and extend through the interior mixing drum 110 generally along the centerline or longitudinal axis 150 of the mixing drum 110. In this manner, the non-linear boom 104, 1800 (and its component parts) is able to avoid contact with the interior sides of the mixing drum 110 or the helical ribbons 122 that mix the concrete inside the mixing drum 110.

The method of the present invention may also include the use of the spraying system 100, 1600 while the container or the mixing drum is rotating. Since the spraying system of the present invention allows for the non-linear boom 104, 1800 of the spraying system 100, 1600 to be inserted into the interior of a drum or container 110 without modification or removal of parts, the drum or container 110 can be rotated without risk or interference to assist with the goals of the spraying system 100, 1600, for example, to wash, clean and/or treat the vessels surfaces. By operating the spraying system 110, 1600 with the drum or container 110 rotating, the helical ribbons 122 or other component parts used in the container or drum 110 can push the medium being sprayed in the interior of the container 110 back out of the container 110.

The extension and retraction of the non-linear boom 104, 1800 may be controlled by an operator at the control panel 214. Control panel 214 is in communication with the drive motor 602 which allows an operator, through communication with the control panel 214 (either physically or remotely through a communications application) to drive the motor 602 either forward or in reverse to advance the non-linear boom 102, 1800 a direction to cause the non-linear boom to move to an extended or retracted position. When the non-linear boom 104, 1800 is inside the mixing drum or container 110, an operator, through the control panel 214 may control the activation of the spray nozzles 1150 attached to the forward-facing water discharge 1102, 1104 and the aft-facing water discharge 1106, 1108. In some examples, the activation of the spray nozzles 1150 may be controlled by a pre-programmed, saved routine that can be initiated with single button activation. Hydraulic valves 302 and 304 permit the operation of the forward-facing water discharge units 1102, 1104 and aft facing water discharge units 1106, 1108 to be operated independently through communication with the control panel 214. Similarly, the activation of the atomizing nozzle 1118 to spray product within the interior of the mixing drum or container 110 is further controlled by control panel 214 being in communication with product supply valve 1110 and compressed air valve 1102.

Further, the spray system 100, 1600 may be designed with more than one atomizer/atomizing nozzle 1118 that may be control together or independently. As illustrated, the spraying system 100, 1600 is a multi-staged system, whereby the hydraulic valve 302 and 304 permit the operation of the forward-facing water discharge units 1102, 1104 and aft facing water discharge units 1106, 1108 to be operated independently (or together), and whereby the atomizer 1118 may be operated separately from or together with through with either or both the communication with the control panel 214 such that the forward-facing water discharge units 1102, 1104 and aft facing water discharge units 1106, 1108. Further, it is not necessary that the first and second water conduits 702, 704 carry and discharge water through the spraying system 100, 1600, other liquids, solutions or suspensions can be discharged through the spraying systems 100, 1600. Further, more than one atomizer 1118 may be used, which may each delivery a different medium through the atomizer 1118. The spraying system 100, 1600 may operate as a multi-staged spraying system capable of delivering different mediums through different spray nozzles 1150 and one or more atomizers 1118 at varying times, in various combinations, with varying mediums, for a variety for purposes, including but to limited, to wash, clean, treat and/or pretreat the interior walls and components of the container 110. In this regard, the method of present invention further includes activating different spray nozzles 1150 and one or more atomizers 1118 at varying times, in various combinations, with varying mediums. For example, the method may include activating the front and aft spray nozzles 1150 together or separately to discharge water, and then, activating the atomizer 1118 to discharge a product solution to coat the interior walls and/or helical ribbons 122 of the container 110. Alternatively, the front and aft spray nozzles 1150 may be operated sequentially (or together) followed by, or in conjunction with, the one or more atomizers 1118, operated sequentially or together when there are more than one atomizers 1118 included in the spraying system 100, 1600, to discharge one or more mediums.

The control panel 214 may be in communication, or in-signal communication with the various valves and system component of the spraying system 100, 1600 and may further be in communicate or signal communication with a remote system, such as a remote device (e.g., controller or mobile device) to control the operation of the spraying system 100, 1600.

It will be understood, and is appreciated by persons skilled in the art, that the control panel 214 may include one or more processes, sub-processes, or process steps to operate the spraying system 100, 1500 described above and that such operation may be performed by hardware and/or software. If the process is performed by software, the software may reside in software memory (not shown) in a suitable electronic processing component or system such as, one or more of the functional components or modules. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It will be understood that the term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

The foregoing description of an implementation of the invention has been presented for purposes of illustration and description. It is not exhaustive and does not limit the claimed inventions to the precise form disclosed. For example, those skilled in the art will recognize that the component parts of the non-linear boom may be rearranged or reconfigured without departing from the scope of the invention. Further, while the above illustrates the support structure capable of elevating the guide mechanism as a scissor lift, other movable devices capable of elevating structures may be used in place of the scissor lift. Further support structures other than trusses may be used in place of the trusses shown in the implementations above without departing from the scope of this invention. Accordingly, modifications and variations are possible in light of the above description or may be acquired from practicing the invention. The claims and their equivalents define the scope of the invention.

I claim:

1. A method for spraying the inside of a container having an access opening to the interior of the container that is offset from the center or rotational axis of the container, the method comprising the steps of:

a) supporting a non-linear boom on a support structure having a guide system mounted therein for engaging and supporting the non-linear boom in an angled and elevated position, where the guide system has a first gear for dynamically engaging and supporting the non-linear boom at a first position along the length of the non-linear boom and at second gear positioned at a second position along the length of the non-linear boom from the first gear and at a height differing from the first gear to moveably support the non-linear boom at a second position along the length of the non-linear boom, the first gear in communication with a reversable motor to move the non-linear boom;

b) inserting the non-linear boom into the access opening to the container that is offset from the center or rotational axis of the container by engaging the motor of the guide system to move the non-linear boom from a retracted to extended position by rotating the first gear on the drive system, where the non-linear boom is curved along its length and has an angle of curvature ranging from 45 to 135 degrees, the non-linear boom comprising a first and second conduit members extending the length of the non-linear boom, and a bottom conduit member, all of which are curved along their length; to create the angle of curvature of the non-linear boom and have a front end and back end where the back end is elevated above the front end, and where the first and second conduit members each include at least one spray nozzle positioned on the front end of the first and second conduit; and c) connecting first and second flexible water lines on the elevated back end of the conduit member to supply water to the first and second conduit member by extending the flexible water line upward to the elevated back end of the first conduit member and connecting the flexible water line to the elevated back end of the first conduct member with a flexible hose connector for introducing and discharging water into the interior of the container through the at least one spray nozzle;

d) running a product supply line to the back end of the bottom conduit member for carrying the product supply line to an atomizing nozzle positioned on the front end of either the first or second conduit member, e) providing channels on the support structure for guiding the first and second flexible water lines and product supply lines to the back end of the non-linear boom so that the first and second flexible water lines and product supply lines do not interfere with the support structure;

e) introducing the cleaning solution medium into the conduit member through the product supply line; and f) discharging the cleaning solution through the atomizing nozzles at a pressure and for a time sufficient to spray the interior of the container.

2. A method for spraying the inside of a container having an opening to the interior of the container that is offset from the center or rotational axis of the container, the method comprising the steps of:

a) supporting a non-linear boom having a front end and back end elevated above the front end on a support structure that moves vertically to elevate the guide system at different positions and that further includes a guide system having a first gear for dynamically engaging and supporting the non-linear boom at a first position along the length of the non-linear boom and a second gear positioned at a second position along the length of the non-linear boom from the first gear and at a height differing from the first gear to moveably support the non-linear boom, where the first gear is in communication with a reversable motor that when actuated turns the first gear to move the non-linear boom from a retracted to extended position, the non-liner boom being curved along its length from the front to back end of the non-linear boom and includes a conduit member having a front end and back end, where the conduit member includes at least one spray nozzle positioned on the front end of the conduit;

b) aligning the opening to the interior of the container with the front end of the non-linear boom by moving the support structure vertically to raise or lower the guide system;

c) inserting the non-linear boom into the opening in the container by moving the non-linear boom from a retracted to an extended position through actuation of the motor; and d) spraying medium into the interior of the container through the at least one spray nozzle at a pressure and for a time sufficient to spray the interior of the container, where the medium is received through the conduit member by a supply line running to the back end of the non-linear boom and guided to the back end of the non-linear boom by at least one channel positioned on the guide system to prevent the supply line from interfering with the movement of the guide system.

3. The method of claim 2 where the step of spraying the medium into the interior of container further includes introducing the medium into the at least one spray nozzle in multiple stages.

4. The method of claim 2 where the conduit member includes at least one atomizer nozzle positioned on the front end of the conduit and where the step of spraying medium into the interior of the container includes spraying medium through at least one spray nozzle for a predetermined period of time followed by spraying medium though at least one the atomizer for a predetermined period of time.

5. The method of claim 2 where the step of supporting a non-linear boom on a support structure having a guide system further includes the support structure supporting the guide system at an angle relative to the surface on which the support structure rests.

6. The method of claim 5 where the support structure supports the guide system at an angle of between 35 to 65 degrees relative to the surface on which the support structure rests.

7. The method of claim 1 further includes the step of aligning the opening to the interior of the container with the front end of the non-linear boom by the support structure moving the guide system vertically to elevate the guide system at different positions.

8. The method of claim 1 where the step of supporting the non-linear boom on a support structure system having a guide system includes the guide system supporting the non-linear boom at an angle off set relative to the center axis of the container.

9. A method for spraying the inside of a container having an access opening to the interior of the container that is offset from the center or rotational axis of the container, the method comprising the steps of:

a) inserting a curved boom having a front end and back into the access opening to the container, where the curved boom has an angle of curvature along its length and includes a first and second conduit member each having a front end and back end, where the back end is elevated above the front end, where the first conduit member includes at least one spray nozzle positioned on the front end of the conduit and where the second conduit member includes an airline running through the second conduit member to supply compressed air to the spray nozzle, where the curved boom is supported in an elevated position by a support structure; and b) introducing a medium into the first conduit member through a flexible water line by elevating the flexible supply line to the elevated back end of the first conduit member and connecting the flexible water line to the elevated back end of the first conduct member;

c) introducing compressed air into the airline by elevating an airline to the back end of the second conduit member and running the airline through the second conduit member to supply compressed air to the spray nozzle, d) providing channels on the support structure for guiding the flexible water line and airline to the back end of the non-linear boom so that the flexible water line and airline do not interfere with the support structure; and d) discharging the medium through the spray nozzles at a pressure by entraining the medium with the compressed air and for a time sufficient to spray the interior of the container.

10. The method of claim 9 where curved boom includes a third conduit member and where the first and third conduit members together include at least four spray nozzles positioned on the front end of the first and third conduit members, where medium is introduced into the third conduit member through a second flexible supply line connected to the elevated back end of the third conduit member and where the step of discharging medium into the interior of the container includes spraying a cleaning solution through the at least four spray nozzles for a predetermined period of time.

* * * * *